(12) United States Patent
Han et al.

(10) Patent No.: US 8,714,776 B2
(45) Date of Patent: May 6, 2014

(54) POROUS AND NON-POROUS NANOSTRUCTURES AND APPLICATION THEREOF

(75) Inventors: Li Han, Apex, NC (US); Anthony L. Andrady, Apex, NC (US); James Lynn Davis, Holly Springs, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 358 days.

(21) Appl. No.: 12/992,112

(22) PCT Filed: May 13, 2009

(86) PCT No.: PCT/US2009/043784
§ 371 (c)(1),
(2), (4) Date: Mar. 23, 2011

(87) PCT Pub. No.: WO2009/140381
PCT Pub. Date: Nov. 19, 2009

(65) Prior Publication Data
US 2011/0194304 A1    Aug. 11, 2011

Related U.S. Application Data

(60) Provisional application No. 61/071,697, filed on May 13, 2008.

(51) Int. Cl.
*F21S 6/00* (2006.01)
(52) U.S. Cl.
USPC .......................................... 362/257; 428/221
(58) Field of Classification Search
USPC ................ 362/257, 555; 264/465; 427/430.1; 428/221, 76
See application file for complete search history.

(56) References Cited

U.S. PATENT DOCUMENTS

| 5,458,784 | A | 10/1995 | Baker et al. |
| 6,113,807 | A | 9/2000 | Yamamura et al. |
| 6,623,977 | B1 | 9/2003 | Farquharson et al. |
| 7,999,455 | B2 * | 8/2011 | Davis et al. ................... 313/503 |
| 2004/0000697 | A1 | 1/2004 | Setoguchi et al. |
| 2004/0262583 | A1 | 12/2004 | Lee |
| 2005/0095695 | A1 | 5/2005 | Shindler et al. |
| 2006/0148978 | A1 | 7/2006 | Reneker et al. |

(Continued)

FOREIGN PATENT DOCUMENTS

| EP | 1 686 208 A1 | 8/2006 |
| JP | 11-166180 A | 6/1999 |
| WO | WO2005/028719 A1 | 3/2005 |
| WO | WO2005/045115 A1 | 5/2005 |

OTHER PUBLICATIONS

Park, J.Y., et al., "Preparation of Electrospun Porous Ethyl Cellulose Fiber by THF/DMAc Binary Solvent System," J. Ind. Eng. Chem., vol. 13, No. 6, pp. 1002-1008, (Sep. 6, 2007).

(Continued)

*Primary Examiner* — Evan Dzierzynski
(74) *Attorney, Agent, or Firm* — Oblon, Spivak, McClelland, Maier & Neustadt, L.L.P.

(57) ABSTRACT

A method for producing a fiber membrane of nanofibers that have both smooth and porous surface features. The method includes materials processing using polymer mixes with solvents and melt polymers with additives. The method includes nanomaterial incorporation onto a fiber structure after formation of the fiber structure. The fiber structure can be a part of a nanoparticle carrier material, a nanoparticle disposal medium, a lighting medium, and a catalysis medium.

48 Claims, 16 Drawing Sheets

(56) References Cited

U.S. PATENT DOCUMENTS

| | | | |
|---|---|---|---|
| 2006/0159837 A1 | 7/2006 | Kaplan et al. | |
| 2006/0264140 A1 | 11/2006 | Andrady et al. | |
| 2006/0280781 A1 | 12/2006 | Reneker et al. | |
| 2007/0035055 A1 | 2/2007 | Gee et al. | |
| 2007/0102372 A1 | 5/2007 | Ferrer et al. | |
| 2007/0190100 A1 | 8/2007 | Shastri et al. | |
| 2007/0190880 A1 | 8/2007 | Dubrow et al. | |
| 2007/0295266 A1 | 12/2007 | Lee et al. | |
| 2008/0090947 A1 | 4/2008 | Shin et al. | |
| 2008/0105887 A1 | 5/2008 | Narendran et al. | |
| 2008/0108122 A1 | 5/2008 | Paul et al. | |
| 2010/0209602 A1* | 8/2010 | Davis et al. | 427/157 |
| 2010/0297768 A1 | 11/2010 | Schindler et al. | |

OTHER PUBLICATIONS

Jun, J.H., et al., "Enhancement of electrical characteristics of electrospun polyaniline nanofibers by embedding the nanofibers with Ga-doped ZnO nanoparticles," Organic Electronics, vol. 9, Issue 4, pp. 445-451, (Feb. 9, 2008), (Abstract Only).

Kamat, P., "Carbon Nanomaterials: Building Blocks in Energy Conversion Devices," The Electrochemical Society Interface, pp. 45-47, (Spring 2006).

Sui, X.M., et al., "White light emission of polyvinyl alcohol/ZnO hybrid nanofibers prepared by electrospinning," Applied Physics Letters 87, pp. 113115-1-113115-3, (Sep. 9, 2005).

Baker, R.T.K., et al., "Pt/Graphite Nanofiber Catalyst in n-Hexane Test Reaction," Journal of Catalysis, vol. 193, Issue 1, pp. 165-167, (Jul. 1, 2000), (Abstract Only).

Eftekharl, A., "Bundled nanofibers of V-doped LiMn2O4 spinel," Solid State Communications, vol. 140, Issues 7-8, pp. 391-394, (Sep. 18, 2006), (Abstract Only).

International Search Report dated Oct. 21, 2009 in PCT/US09/043784 filed May 13, 2009.

Extended European Search Report issued Jul. 5, 2012, in European Patent Application No. 09747465.4.

Communication pursuant to Rules 70(2) and 70a(2) EPC issued Jul. 24, 2012, in European Patent Application No. 09747465.4.

Jin Hyung Jun, et al., "Enhancement of electrical characteristics of electrospun polyaniline nanofibers by embedding the nanofibers with Ga-doped ZnO nanoparticles", Organic Electronics, vol. 9, No. 4, XP-022681628, Feb. 9, 2008, pp. 445-451 (previously filed on Nov. 11, 2010, submitting complete reference).

Alpa C. Patel, et al., "Electrospinning of Porous Silica Nanofibers Containing Silver Nanoparticles for Catalytic Applications", Chemistry of Materials, XP-002507164, 19, Feb. 23, 2007, pp. 1231-1238.

Dan Li, et al., "Electrospinning of Nanofibers: Reinventing the Wheel?", Advanced Materials, vol. 16, No. 14, XP-002385745, Jul. 19, 2004, pp. 1151-1170.

Japanese Office Action Issued Mar. 26, 2013 in Patent Application No. 2011-509653 (with English translation).

* cited by examiner

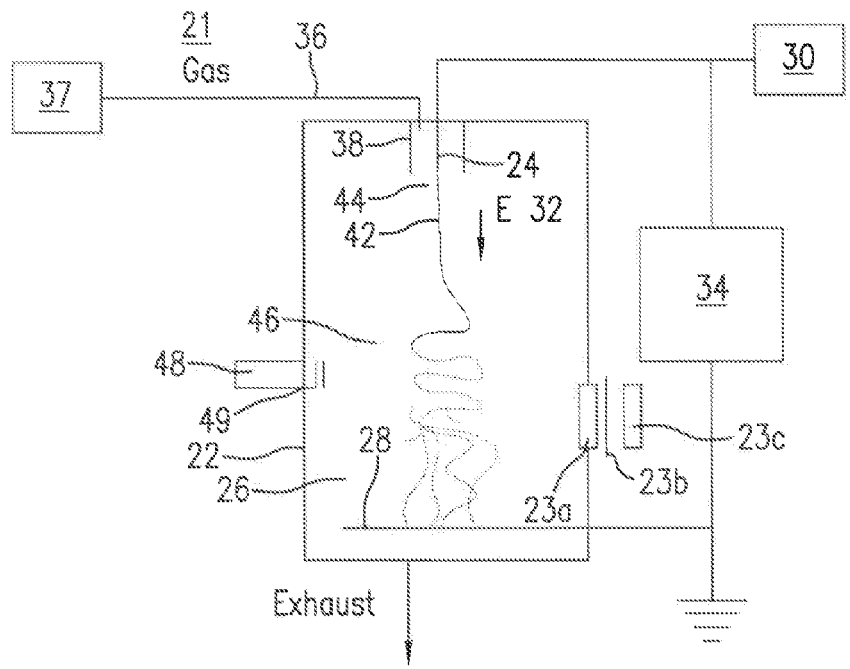

FIG. 1

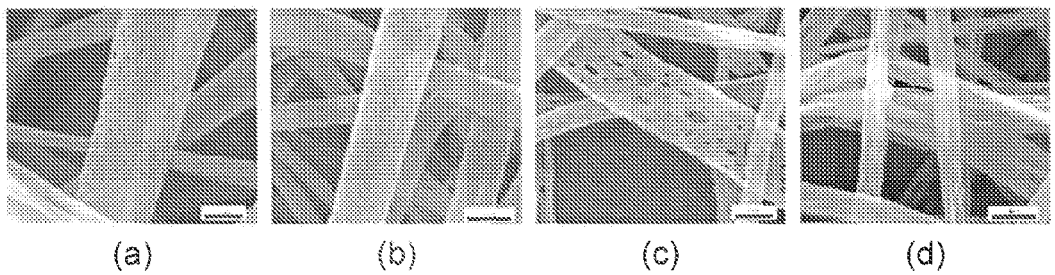

Scanning Electron Microscopy (SEM) Images of porous PMMA nanofibers. Electrospinning conditions: +20KV, 1.0ml/Hr, collector grounded. Concentration of the solvents for the samples: (a) 98% toluene, 2% N-methylformamide; (b) 95% toluene, 5% N-methylformamide; (c) 90% toluene, 10% N-methylformamide; (d) 80% toluene, 20% N-methylformamide. The scale marker is a 1 micron bar for (a), (b), (c). The scale marker is a 2 micron bar for (d).

FIG. 2A

Scanning Electron Microscopy (SEM) Images of porous PMMA nanofibers. Electrospinning conditions: +20KV, 1.0ml/Hr, collector grounded. Concentration of the solvents for the samples: (a) 98% toluene, 2% N-methylformamide;

(b) 95% toluene, 5% N-methylformamide;

(c) 90% toluene, 10% N-methylformamide;

(d) 80% toluene, 20% N-methylformamide.

Transmission Electron Microscopy (TEM) image of porous PMMA nanofiber.

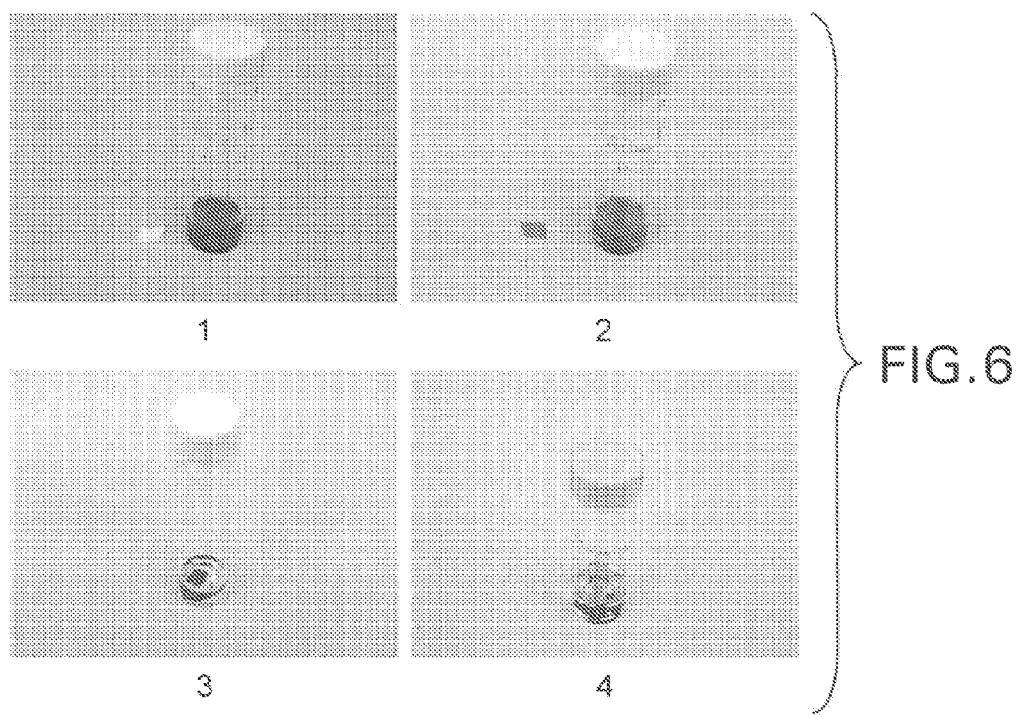

FIG. 6

1. PAN electrospun nanofiber mat(left) and solution of $Au_{2-nm}$ NPs in Hexane (right)
2. QDE coated PAN nanofiber mat dried in air (left) shows color change from white to dark brown, indicate NP loading on nanofiber mat
3. QDE mat in pure Hexane solvent
4. A very small amount of DMF was added to the hexane solution, the solvent color changed to light brown, indicate NP desorption from nanofiber mat SEM images (A and B) and EDX mapping image (C) of the PAN/Au carbon nanofibers, the white dot in (C) indicates the location of the Au nanoparticles on the carbon nanofibers.

POROUS AND NON-POROUS NANOSTRUCTURES AND APPLICATION THEREOF

CROSS REFERENCE TO RELATED APPLICATIONS

This application is related to U.S. application Ser. No. 10/819,916, filed on Apr. 8, 2004, entitled "Electrospinning of Polymer Nanofibers Using a Rotating Spray Head," the entire contents of which are incorporated herein by reference. This application is also related to U.S. application Ser. No. 10/819,942, filed on Apr. 8, 2004, entitled "Electrospray/electrospinning Apparatus and Method," the entire contents of which are incorporated herein by reference. This application is related to U.S. application Ser. No. 10/819,945, filed Apr. 8, 2004, entitled "Electrospinning in a Controlled Gaseous Environment," the entire contents of which are incorporated herein by reference. This application is related to U.S. Ser. No. 11/130,269, filed May 17, 2005 entitled "Nanofiber Mats and Production Methods Thereof," the entire contents of which are incorporated herein by reference. This application is related to U.S. application Ser. No. 11/559,282, filed on Nov. 13, 2006, entitled "Particle Filter System Incorporating Nanofibers," the entire contents of which are incorporated herein by reference. This application is related to U.S. application Ser. No. 11/559,260, filed on Nov. 13, 2006, entitled "Luminescence Device," the entire contents of which are incorporated herein by reference. This application is related to U.S. application Ser. No. 11/615,285, filed on Dec. 22, 2006, entitled "Polymer Nanofiber-based Electronic Nose" the entire contents of which are incorporated herein by reference. This application is related to U.S. Application Ser. No. 60/929,077, filed on Jun. 12, 2007, entitled "Long-pass Optical Filter Made From Nanofibers," the entire contents of which are incorporated herein by reference.

BACKGROUND OF THE INVENTION

1. Field of the Invention

Nanofiber structures and methods for producing nanofiber structures having surface porosity and coating methods for porous and non-porous nanofibers. These materials may be used in applications such as catalysis, lighting, and nanomaterial storage and transportation.

2. Description of the Related Art

Nanofibers can be used in a variety of applications from clothing industry to military combat. Electrospinning techniques for nanofiber production have attracted attention recently. The unique material properties of nanofiber materials mainly come from the ultra-high surface area. Nanofibers with porous surface feature have higher surface area than smooth nanofibers. Several types of fabrication methods had been reported in the literature to make porous feature on nanofiber surface.

Template removal and fabrication of nanoporous inorganic nanofibers have been reported by electrospinning a blend solution of a polymer and silica nanoparticle followed by removal of the polymer by calcinations, leaving behind the silica nanofibers, as disclosed in Kanehata et. al., Nanotechnology. 2007, 18, 1-7. Porous polymer nanofibers have also been obtained by low temperature electrospinning using ice crystal as a removable template, as disclosed by Simonet et al., Polymer Engineering and Science, 2007, 47, 2020-2026. However, these methods involve either specific material processing condition or special electrospinning conditions to obtain the desired porous nanofiber structure. Other techniques have also been used to obtain porous nanofibers by spinning the fiber into water vapor, a technique based on the so called "breath figures." Srinivasarao et. al. in Science, 292 (5514): 79 Apr. 6, 2001 have reported on porosity development in polymer membranes due to the deposition of minute droplets of water. This technique has the potential for electrospinning of porous nanofibers, as reported by S. Megelski, J. S. Stephans, D. B. Chase, and J. F Rabolt, in Macromolecules, 35, 8456 (2002). Wendroff et. al. (U.S. Pat. No. 6,790,528) also reported that, with specific polymer/volatile solvent pairs, conventional spinning can yield porous nanofibers.

U.S. application Ser. No. 11/559,260 entitled "Luminescence Device," referenced above, describes ways to utilize nanoparticles and nanofibers to produce a white light spectrum.

One problem discussed in detail below and recognized by the inventors relates to the safety, handling, attachment, processing of nanoparticles in the luminescent device and catalysis applications. This general problem affects not only the luminescent applications but also affects other application areas where nanoparticle handling and/or attachment to other material structures is at issue. Other problems with the background art, which the present inventors have recognized, concern the lack of porosity control in these background art techniques.

SUMMARY OF THE INVENTION

One feature of the invention is to provide an apparatus and a method for improving the process window for production of electrospun fibers including formulations to make porous and smooth electrospun nanofibers from polymer solutions Another feature is to provide an apparatus and a method which produce polymer nanofibers with porous and non-porous surface features including methods and formulation to make porous polymer nanofibers from polymer melt with two compositions.

Yet another feature of the invention is to promote the method and conditions for quantum dot embedded in porous and smooth electrospun polymer nanofibers.

Still another feature of the invention is to promote application of the electrospun porous and smooth polymer nanofibers for nanoparticle carrier materials.

Still another feature of the invention is to promote application of using the electrospun porous and smooth polymer nanofibers as a medium to dispose nanoparticle material.

Still another feature of the invention is to promote application of the electrospun porous and smooth polymer nanofibers for lighting.

Still another feature of the invention is to promote application of the electrospun porous and smooth polymer nanofibers for catalysis.

Various of these and other features are provided for in the disclosed embodiments of the invention given below.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic depicting an electrospinning apparatus suitable for deposition of fibers and/or nanofibers of the invention including for example the incorporation of nanoparticles;

FIGS. 2A, 2B(A), 2B(B), 2B(C), and 2B(D) are scanning electron microscopy images of porous polymer nanofibers prepared using the method illustrated in FIG. 1;

FIG. 6 are pictures showing the QDE or NPE adsorption and desorption process of QDs;

DETAILED DESCRIPTION OF THE EMBODIMENTS

Figure 2B:
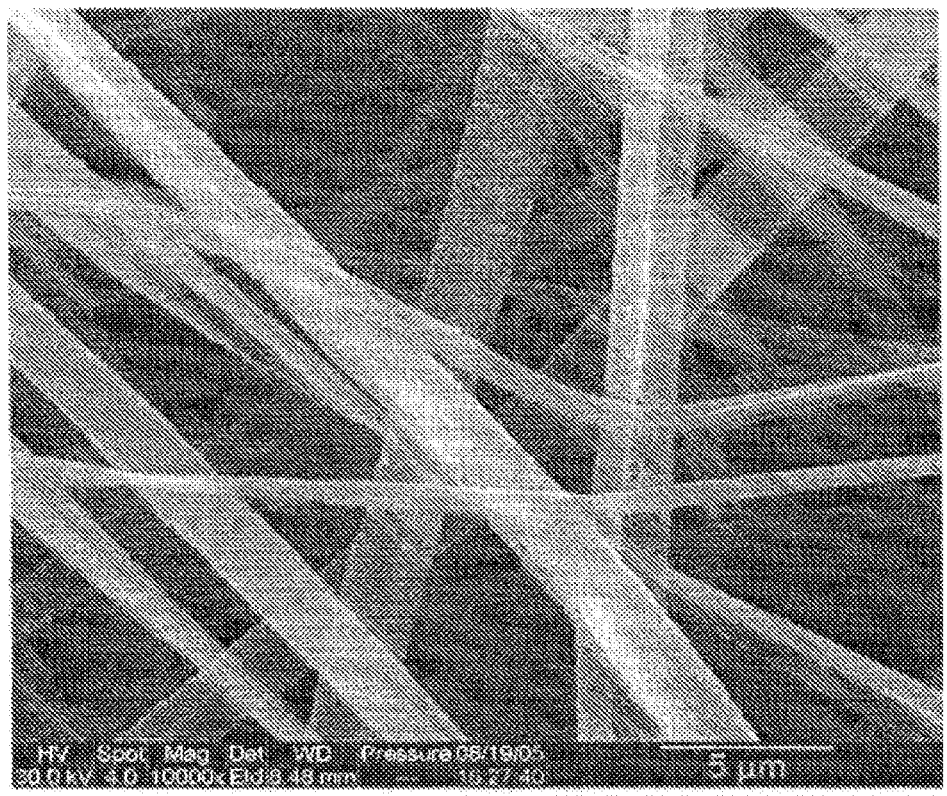
Figure 2B:
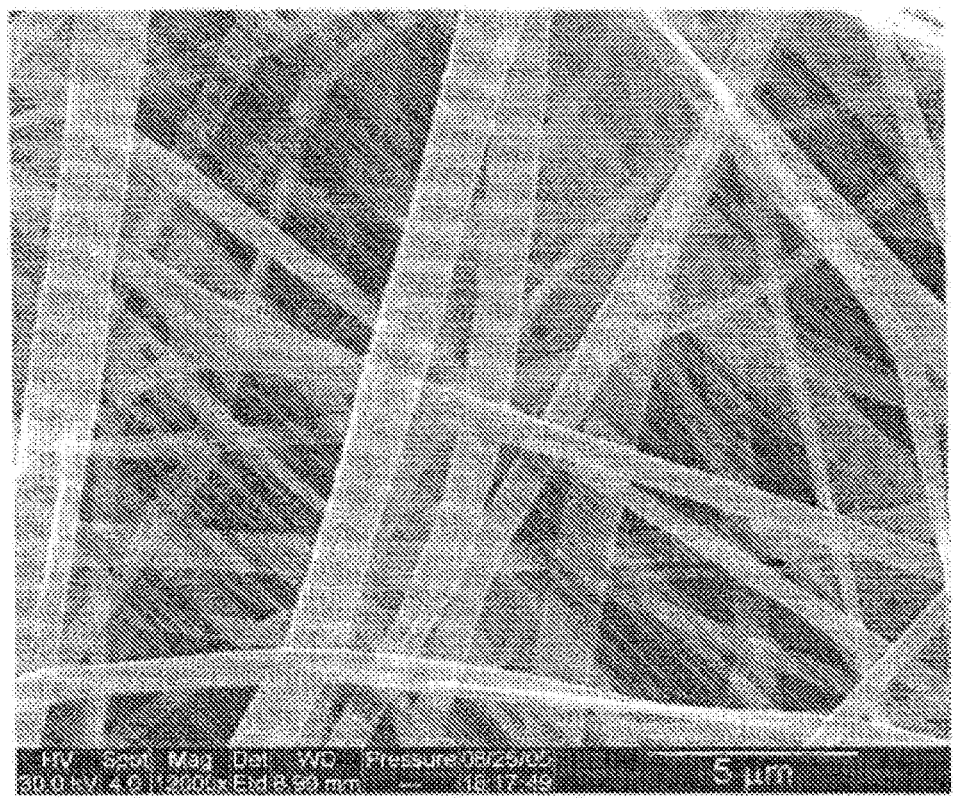
Figure 2B:
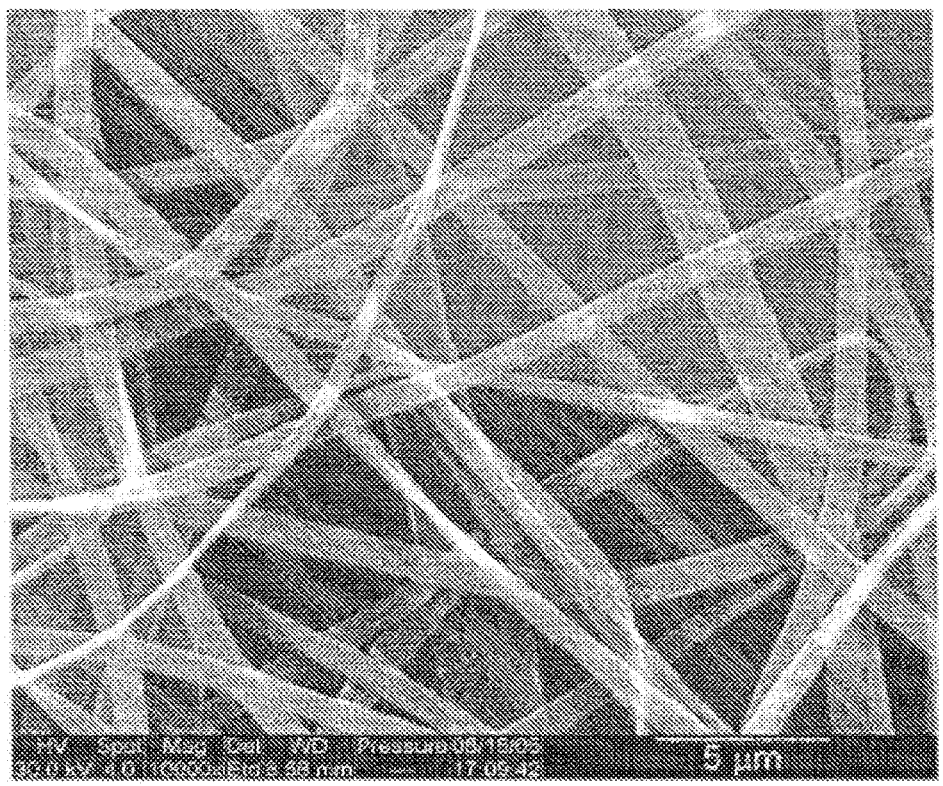
Figure 2B:
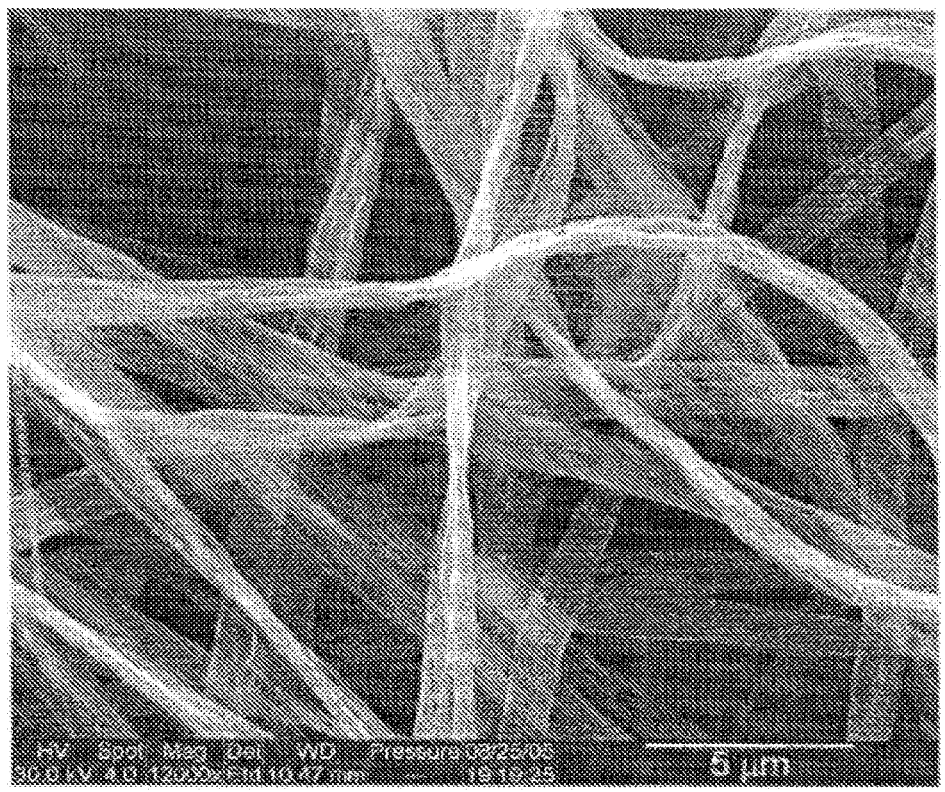

Nanofibers typically have a solid structure that can have one dimension (e.g., their diameter) in the 10-2000 nm range, while the other dimensions (e.g., the length) can be quite long such as for example even meters in dimension. Nanofibers suitable for the invention can be made from a variety of materials, including polymers, ceramics, and glasses, sol gels, polyimides, and blends of materials can also be readily fabricated.

One feature of nanofibers is their small diameter and consequently high surface area. Nanofiber diameters on the order of visible light (~500 nm) or even smaller can be readily produced using the methods disclosed herein creating very large surface areas. A surface of the polymer nanofibers can be smooth or rough, such as porous feature. A rough surface morphology of the nanofiber normally presents an even larger surface area of the nanofiber material than would be available if the nanofiber material were smooth. In one example of a porous surface features, the pore can be in the range of 1 nm to 1000 nm, the depth of the pore can be in the range of 1 nm to 1000 nm. Assuming the pore is to be a perfect half sphere into nanofiber surface and assuming there is one pore per unit area, replacing circular area with a half sphere pore into the nanofiber surface will result in 100% increase of the countable surface area. Other pore shapes, such as cylinder or oval shape will increase the surface area to larger than 100%. As shown in FIG. 2, the pores of the invention are not exclusively perfect half spheres. Irregular and different pore shapes provide also for surface area enhancement. As such, the pores in the invention can lead to surface area enhancements of 50% or higher, including in some cases as much as 200% increases in surface areas.

Nanoparticles are typically particle materials in the size range of the 1 nm-1000 nm. While a sphere is one of the most common shapes of the nanoparticles, a nanoparticle material can be made into different shapes, such as rods, rectangular, square, and cylinders.

Nanoparticles can vary in composition. One of the most common forms of the nanoparticles is a core-shell particle, where the core can be a metal or inorganic compound, The shell (surface capping) can be made with an inorganic or organic material to provide passivation, environmental protection, or improved electrical or optical stability. An example of such a structure is Au nanoparticles capped with decanthiolate capping molecules, the other example is CdSe/ZnS in which a ZnS shell surrounds a CdSe core. The surface capping shell layers frequently have the functionality of preventing particles from aggregating to each other. The surface capping layer can also determine the particle solubility in solvents. The shell molecules can also be modified to change the overall properties of the nanoparticles.

Hence, in one embodiment of the invention, nanoparticles and electrospun polymer nanofibers can be combined to form composite polymer/nanoparticle nanofiber material. In such a composite material, the nanoparticles can be both inside the polymer bulk, or the nanoparticles can be on the surface of the nanofibers or partially embedded in the surface of the nanofibers. Where in latter cases, there are normally unexpected material properties which emerge, such as for example the enhancement of the optical properties of the fluorescence nanoparticles. This enhanced property mainly originates from the combination of the size defined property of the nanoparticle and the high surface area of the polymer nanofibers.

In one embodiment of the invention, the nanoparticles are attached to polymer nanofibers after electrospinning of the nanofibers by using the Quantum Dot Embedment (QDE) techniques described below.

Nanofiber Fabrication Procedures

Referring now to the drawings, wherein like reference numerals designate identical or corresponding parts throughout the several views, FIG. 1 is a schematic illustration depicting an electrospinning apparatus suitable for deposition of fibers and/or nanofibers of the invention. In one embodiment of the invention, particles (such as for example light stimulable particles) are incorporated into the fibers and/or nanofibers of the invention. For embodiments using light stimulable particles, these particles emit secondary light upon being irradiated with a primary light. The light stimulable particles are in one embodiment smaller than the diameter of the nanofibers.

In FIG. 1, an electrospinning apparatus 21 includes a chamber 22 surrounding an electrospinning element 24. As such, the electrospinning element 24 is configured to electrospin a substance from which fibers are composed to form fibers 26. The electrospinning apparatus 21 includes a collector 28 disposed from the electrospinning element 24 and configured to collect the fibers and/or nanofibers. Various methods for forming fibers and nanofibers are described in U.S. Ser. Nos. 10/819,942, 10/819,945, and 10/819,916 which are listed and incorporated by reference above.

The electrospinning element 24 communicates with a reservoir supply 30 containing the electrospray medium such as for example the above-noted polymer solution. The electrospray medium of the invention includes polymer solutions and/or melts known in the art for the extrusion of fibers including extrusions of nanofiber materials. Indeed, polymers and solvents suitable for the invention include for example polystyrene in dimethylformamide or toluene, polycaprolactone in dimethylformamide/methylene chloride mixture, poly(ethyleneoxide) in distilled water, poly(acrylic acid) in distilled water, poly(methyl methacrylate) PMMA in acetone, cellulose acetate in acetone, polyacrylonitrile in dimethylformamide, polylactide in dichloromethane or dimethylformamide, and poly(vinylalcohol) in distilled water and combinations thereof. In general, suitable solvents for the invention include both organic and inorganic solvents in which polymers can be dissolved. The polymer materials when formed are preferably transparent materials, although the polymers may be spun with additives that act as color filters for the luminescent compounds (as discussed in more detail later).

A high voltage source 34 is provided to maintain the electrospinning element 24 at a high voltage. The collector 28 is placed preferably 1 to 100 cm away from the tip of the electrospinning element 24. The collector 28 can be a plate or a screen. Typically, an electric field strength between 2,000 and 400,000 V/m is established by the high voltage source 34. Typically, the collector 28 is grounded, and the fibers 26 produced by electrospinning from the electrospinning elements 24 are directed by the electric field 32 toward the collector 28. The electric field 32 pulls the substance from which the fiber is to be composed as a filament or liquid jet 42 of fluid from the tip of the electrospinning element 24. A supply of the substance to each electrospinning element 24 is preferably balanced with the electric field strength responsible for extracting the substance from which the fibers are to be composed so that a droplet shape exiting the electrospinning element 24 is maintained constant. In the polymer solutions (or alternatively introduced onto the fibers after or during the electrospinning process) are luminescent compounds. The fibers deposited in the one embodiment of the invention may range from 50 nm to several microns in diameter.

As illustrative of the electrospinning process of the invention, the following non-limiting example is given to illustrate selection of the polymer, solvent, a gap distance between a tip of the extrusion element and the collection surface, solvent pump rate, and addition of electronegative gases:

a polystyrene solution of a molecular weight of 350 kg/mol,
a solvent of dimethylformamide DMF,
an extrusion element tip diameter of 1000 μm,
an Al plate collector,
~0.5 ml/hr pump rate providing the polymer solution,
an electronegative gas flow of $CO_2$ at 8 lpm,
an electric field strength of 2 KV/cm, and
a gap distance between the tip of the extrusion element and the collector of 17.5 cm.

As in the related application, U.S. Ser. No. 11/130,269 (previously incorporated by reference), the invention here can use different electrospinning elements to generate a fiber mat of mixed fibers of different sized fibers. The fiber mat can have for example one side of the mat with a larger average fiber diameter than another side of the fiber mat.

The fibers used in the nanofibers of the invention here can include, but are not limited to acrylonitrile/butadiene copolymer, cellulose, cellulose acetate, chitosan, collagen, DNA, fibrinogen, fibronectin, nylon, poly(acrylic acid), poly(chloro styrene), poly(dimethyl siloxane), poly(ether imide), poly (ether sulfone), poly(alkyl acrylate), poly(ethyl acrylate), poly(ethyl vinyl acetate), poly(ethyl-co-vinyl acetate), poly (ethylene oxide), poly(ethylene terephthalate), poly(lactic acid-co-glycolic acid), poly(methacrylic acid) salt, poly(methyl methacrylate), poly(methyl styrene), poly(styrene sulfonic acid) salt, poly(styrene sulfonyl fluoride), poly(styrene-co-acrylonitrile), poly(styrene-co-butadiene), poly(styrene-co-divinyl benzene), poly(vinyl acetate), polylactides, poly (vinyl alcohol), poly(vinyl chloride), poly(vinylidene fluoride), polyacrylamide, polyacrylonitrile, polyamide, polyaniline, polybenzimidazole, polycaprolactone, polycarbonate, poly(dimethylsiloxane-co-polyethyleneoxide), poly (etheretherketone), polyethylene, polyethyleneimine, polyimide, polyamide, polyisoprene, polylactide, polypropylene, polystyrene, polysulfone, polyurethane, poly(vinylpyrrolidone), proteins, SEBS copolymer, silk, and styrene/isoprene copolymer.

Additionally, nanofibers containing polymer blends can also be produced as long as the two or more polymers are soluble in a common solvent. A few examples would be: poly(vinylidene fluoride)-blend-poly(methyl methacrylate), poly(methyl methacrylate)-blend-poly(alkyl acrylate), polystyrene-blend-poly(vinylmethylether), poly(methyl methacrylate)-blend-poly(ethyleneoxide), poly(hydroxypropyl methacrylate)-blend poly(vinylpyrrolidone), poly(hydroxybutyrate)-blend-poly(ethylene oxide), protein blend-polyethyleneoxide, polylactide-blend-polyvinylpyrrolidone, polystyrene-blend-polyester, polyester-blend-poly(hyroxyethyl methacrylate), poly(ethylene oxide)-blend poly(methyl methacrylate), poly(hydroxystyrene)-blend-poly(ethylene oxide)).

Conditions for Making Relatively Smooth Polymer Nanofibers

One of the above polymer solutions with a one solvent system or a melt polymer with one component can be used to fabricate smooth polymer nanofibers by the electrospinnning techniques described above. Further, besides solvent electrospinning, melt electrospinning process is a similar process to the solvent electrospinning techniques, except that there is no solvent involved in the melt electrospinning process and the polymer used for the melt is heated up to 200-300° C. in polymer reservoir prior to electrospinning. Smooth fibers can be generated using a single polymer system. Examples of suitable polymers for melt electrospinning include, but are not limited to: Acrylonitrile-Butadiene-Styrene, Ethylene vinyl alcohol, Fluoropolymers, Polyacetal, Polyacrylonitrile, Polyacrylates, Polyamide, Polyamide-imide, Polyaryletherketone, Polybutadiene, Polybutylene, Polycarbonate, Polyektone, Polyester, Polyetheretherketone, Polyetherimide, Polyethersulfone, Polyethersulfone, Polyethylene, Polyethylenechlorinates, Polyimide, Polymethylpentene, Polyphenylene Oxide, Polyphenylene Sulfide, Polyphthalamide, Polypropylene, Polystyrene, Polyurethane, Polyvinylchloride, and Polyvinylidene Chloride.

Conditions for Making Porous Polymer Nanofibers

Solvent Electrospinning Technique:

In this embodiment, a polymer solution 2-10 percent (by weight) is mixed with an additive that is not volatile but that is of a high dielectric constant relative to the polymer to achieve the porosity, the dielectric constant of the additive solvent in one embodiment is in the range of 50-189. In one embodiment, N-methylformamide is used as an organic solvent with a suitably high dielectric constant and is added to the mixture of solvent with weight percentage of 1-20 wt %. Toluene is one solvent that can be used with the N-methylformamide. In one embodiment, toluene is used in the electrospinning mixture as a large weight percent of the mixture, for example in a range of the 80-99 wt %. Porous poly(methyl methacrylate) PMMA polymer nanofibers produced from these toluene/methyl formamide/PMMA are shown as an example in FIGS. 2 and 3. Conditions for the electrospinnning follow closely the illustrated example above except for the inclusion of the toluene, the substitution of the methyl formamide for the dimethylformamide, and the substitution of the PMMA for the polystyrene.

The average pore size obtained using this approach was seen to depend on the weight fraction of the additive in the spinning solution. This effect was demonstrated for the range of 2% and 20% (by weight) of N-methylformamide. At levels exceeding 20%, the pores were found to be too large to maintain the cylindrical shape of the nanofibers. Under these conditions, the porous fiber tended to collapse and fold into a ribbon, as shown in FIG. 2A and FIG. 3.

Figure 3:
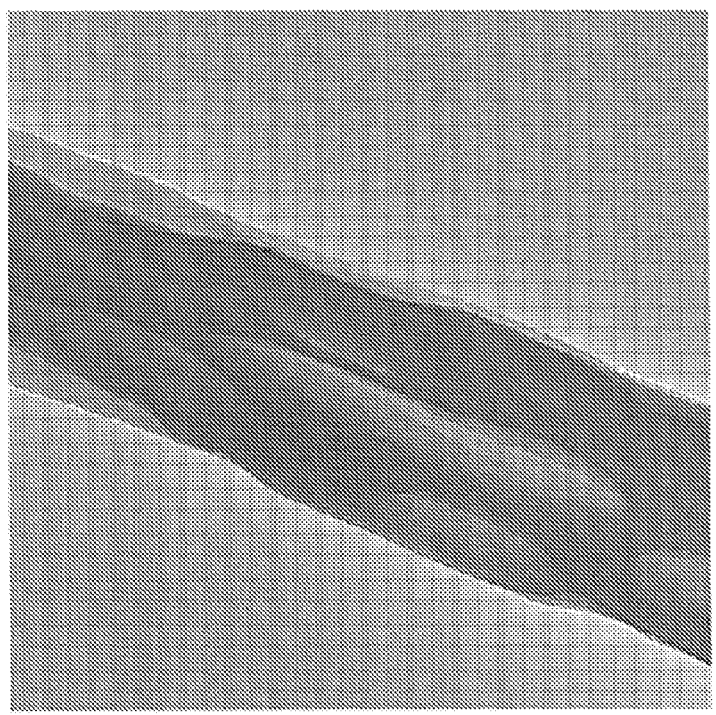
FIG. 3 is transmission electron microscopy image of a porous polymer nanofiber prepared using the method illustrated in FIG. 1.

FIG. 2A shows scanning electron microscopy (SEM) images of porous PMMA nanofibers made under electrospinning conditions +20 KV, 1.0 ml/Hr, collector grounded. Concentration of the solvents for the samples: (a) 98% toluene, 2% N-methylformamide; (b) 95% toluene, 5% N-methylformamide; (c) 90% toluene, 10% N-methylformamide; (d) 80% toluene, 20% N-methylformamide. FIGS. 2A, 2B(A), 2B(B), 2B(C), and 2B(D) show additional scanning electron eicroscopy (SEM) images of porous PMMA nanofibers at lower magnification made under electrospinning conditions: +20 KV, 1.0 ml/Hr, collector grounded. Concentration of the solvents for the samples: (a) 98% toluene, 2% N-methylformamide; (b) 95% toluene, 5% N-methylformamide; (c) 90% toluene, 10% N-methylformamide; (d) 80% toluene, 20% N-methylformamide.

In FIGS. 2A and 2B, it is apparent that the addition of high dielectric constant solvent, such as N-methylformamide, make the resultant nanofibers porous, and eventually into a ribbon shape, as compared with round, cylinder shape for smooth nanofiber prepared with a single solvent system. For nanofibers prepared with lower concentration of N-methylformamide, such as 2%-5%, instead of a perfect sphere or circular shape on the nanofiber surface, the pore structures tends to become slightly more elongated, especially along the longitudinal direction of the resultant nanofiber. When the concentration of the N-methylformamide increases 10%-20%, the round pore tends to become even more elongated along the longitudinal direction of the resultant nanofiber. When the N-methylformamide concentration reach to 20%, the pores started to merger into each other and form very rough surface features on nanofiber surface These features can be characterized as round pores at certain experimental conditions and the existence of the threshold is clearly observed between 5% and 10% weight ratio N-methylformamide, where the pore size significantly increases and the shape becomes more elongated.

It is observed that the pores on the nanofibers range in shape from slightly elongated shapes to oval shapes and have an aspect ratio in the range of 1.1:1 to 10:1. The pores are partially embedded into the surface of the nanofiber and in some instances have an estimated depth of 5-100 nm, although smaller pore depths may not be readily detectable. The pores have an estimated length from 5-100 nm, although smaller pore lengths may not be readily detectable. The pores thus expose an interior surface of the nanofiber, providing for an increased surface area, as compared to a similar diameter nanofiber without pores. Adjacent pores can be totally separated from each other by a nanofiber wall material in between, or adjacent pores can partially overlap forming larger cavities in the nanofibers.

Examples of other high dielectric constant solvents suitable for the invention include, but are not limited to: N-Methylformamide, N-Methylacetamide, N-Methylpropanamide, N-Ethylacetamide, N-Propylpropanamide, Foramide, N-Butylacetamide, N-Ethylformamide. Their compatible solvents include but not limited to are toluene, dimethylformamide, chloroform, dichloromethane, dimethylacetamide, and acetone. The polymers include but not limited to are Poly(methyl methacrylate), Poly(butyl methacrylate), poly(Benzyl methacrylate), Poly(caprolactone), Poly(vinyl alcohol), Poly(Acrylonitrile), poly(carbonate), and blends thereof.

Melt Electrospinning with a Binary Polymer System Electrospinning Followed by Polymer Template Removal:

In this embodiment, a melt electrospinning process as discussed above is a similar process to the solvent electrospinning techniques, except that there is no solvent involved in the melt electrospinning process and polymer used for the melt is heated up to 200-300° C. in polymer reservoir prior to electrospinning. For a porosity in the resultant nanostructure, porous polymer nanofibers can be obtained by electrospinning immiscible polymer blends, in which one polymer serve as a backbone (or a first base) while the other polymer serve as a template (or a second base). In this embodiment of the invention, there is no common solvent for both polymers. Upon the nanofiber membrane formation in the electrospinning process, the template polymer can be removed by soaking the membrane structure in a suitable solvent that can extract template polymers from the nanofiber and which does not dissolve the backbone polymer. Creating of a porous polymer nanofiber using template polymers has been reported using solvent based polymer nanofiber electrospinning. Below is the list of references incorporated herein by reference:

Madhugiri, S., W. L. Zhou, et al. (2003). "Electrospun mesoporous molecular sieve fibers." *Microporous and Mesoporous Materials* 63(1-3): 75-84.

Han, S. O., W. K. Son, et al. (2004). "Preparation of porous ultra-fine fibres via selective thermal degradation of electrospun polyetherimide/poly(3-hydroxybutyrate-co-3-hydroxyvalerate) fibres." *Polymer Degradation and Stability* 86(2): 257-262.

Li, X. S, and G. Y. Nie (2004). "Nano-porous ultra-high specific surface ultrafine fibers." *Chinese Science Bulletin* 49(22): 2368-2371.

Lyoo, W. S., J. H. Youk, et al. (2005). "Preparation of porous ultra-fine poly(vinyl cinnamate) fibers." *Materials Letters* 59(28): 3558-3562.

You, Y., J. H. Youk, et al. (2006). "Preparation of porous ultrafine PGA fibers via selective dissolution of electrospun PGA/PLA blend fibers." *Materials Letters* 60(6): 757-760.

Li, L. and Y. L. Hsieh (2006). "Chitosan bicomponent nanofibers and nanoporous fibers." *Carbohydrate Research* 341 (3): 374-381.

Zhang, L. F. and Y. L. Hsieh (2006). "Nanoporous ultrahigh specific surface polyacrylonitrile fibres." *Nanotechnology* 17(17): 4416-4423.

Binary Polymer Example:

Backbone polymer poly(vinyl acetate) (PVAc) and a template polymer poly(b-hydroxybutyrate) (PHB) are used in this example. An immiscible polymer blend of PVAc is heated to 90-200° C. and subject to electrospinning to form a polymer nanofiber membrane. The resulting nanofiber membrane was then placed into soxhlet extractor with dichloromethane solvent for 8 hours to complete remove the PHB polymer. A porous PVAc polymer membrane was formed.

The general experimental procedures associated with electrospinning polymer solutions also apply to the electrospinning from polymer melts. However, because of the higher voltages needed, the electrospinning is conventionally carried out in a vacuum. In the literature on melt-spun nanofibers, the average fiber diameters appear to be larger than for solvent-electrospun nanofibers of the same polymer in the range of 10-200 µm. In the invention here, nanofibers are electrospun in an electronegative gas ambient producing nanofibers of the backbone and template polymers. The template polymer is extracted out from a polymer nanofiber membrane using a soxhelt extraction without changing the backbone polymer structure and morphologies. Soxhlet is a known laboratory apparatus that can be used to extract impurities from solid material that has limited solubility in the solvent used for extraction.

Nanoparticle Embedment Procedures

Regardless of the fabrication procedures described above or otherwise used to prepare a fiber mat of fibers and nanofibers, the invention here in one embodiment utilizes a novel approach to embed nanoparticles in the fiber mat. This simple one-step technique provides for various and diverse applications in the handling, storage, waste recovery, disposal, and utilization of nanoparticles in specific products detailed below.

Nanoparticle Infiltration

Figure 4:
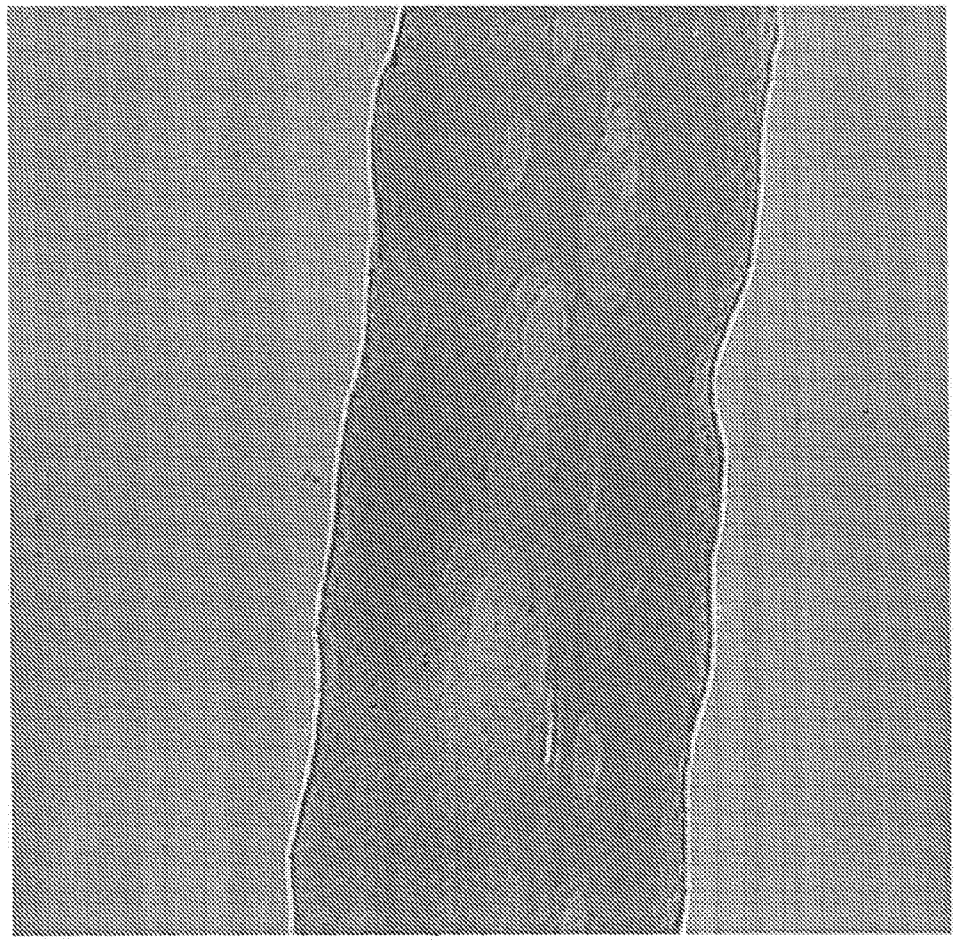
FIG. 4 is a transmission electron microscopy image of a polymer/QD or nanoparticle composite nanofiber prepared using a Quantum Dot Embedment (QDE) or Nanoparticle Embedment (NPE) technique of the invention.

For the results in FIG. 4, a quantum dot (QD) or a nanoparticle embedded polymer nanofiber structure is made in the invention by a simple one-step techniques referred to herein as a Quantum Dot Embedment (QDE) technique or referred to here more generally as a nanoparticle embedment (NPE) technique, since many nanoparticles used in the invention are not quantum dots. In this process, pre-electrospun polymer nanofibers are immersed into a quantum dot solution which will not dissolve the polymer, but which will slightly swell the polymer. A quantum dot or nanoparticle solution can be made in the invention using the conventional colloid synthesis method. The resulting nanoparticles and/or quantum dots are in organic solvents with concentration in the range of 10-150 µmol/l. The temperature of the nanoparticle or quantum dot solution is at room temperature of 20-25° C.

During the QDE or NPE process, the polymer nanofiber swells due to the infiltration of the solvent into the polymer which softens and opens the polymer network. A nanoparticle or quantum dot moves to the polymer surface from the solution due to for example Brownian motion of the nanoparticle or quantum dot in the solution. Thus, a fiber immersed into a nanoparticle or quantum dot solution for example for a period of time of 5 seconds to 72 hours uptakes the nanoparticles or quantum dots. The resultant nanostructure can then be rinsed for example at a constant solvent flow for 20-30 seconds to ensure the removal of the any loosely attached surface nanoparticles or quantum dots. The resultant fiber membrane in this example was placed onto a clean microscope slide and allowed to dry under room temperature before use. Individual nanoparticles or quantum dots are visible at both outside and inside of the nanofibers in the transmission electron microscopy image as shown in FIG. 4. Minimum agglomeration is observed from this and other images.

According to one embodiment of the invention, the surface packing density of the nanoparticles or quantum dots on the polymer nanofiber can be controlled by several parameters, such as immersion time, nanoparticle solution concentration, the solvent composition, and experimental temperature. These factors will affect of the swelling of the polymer nanofiber in the presence of the solvent. Further, an elevated temperature can facilitate the movement of the nanoparticle or quantum dot during Brownian motion. The elevated temperature is typically lower than the glass transition point of the polymer and below the boiling point of the QDE solvent, normally in the temperature range of 50-100° C.

Nanoparticle Embedment Example:

Au 2-nm Nanoparticles in hexane. Polymer nanofiber: Poly (methylmethacrylate) (PMMA). An Au 2-nm nanoparticle solution was heated to 50° C. in the presence of PMMA nanofiber membrane. While the applied temperature is much lower than the glass transition temperature of PMMA, PMMA nanofibers does not changed its structure and morphology. However, the applied temperature helps to soften the polymer and allows nanoparticles to more freely moved into the subsurface of the nanofibers. Equal importantly, the elevated temperature helps facilitate the Brownian movement of the nanoparticles and allow faster embedment process to occur.

The results above show that a polymer nanofiber mat structure of the invention can capture QDs (Quantum Dots) and/or nanoparticles. One mechanism of the particle adsorption to the nanofibers is believed to be by way of Brownian motion of the particles in the polymer/liquid interface, although other mechanisms may also be in effect. The solvent which carries nanoparticles first softens the polymer nanofiber surface layer and opens up the network structure. The particles then move into the polymer matrix (e.g., due to the Brownian motion or other mechanism). This is a process which normally takes less than 1 minute. However, the effect of the solvent properties, temperature of the environment and surface chemistry of the nanofiber and nanoparticles can impact the uptake time. These factors for example will likely change the sorption properties of the nanoparticles and nanofibers significantly, which allow for several different applications of this QDE technique.

Other mechanisms for particle adsorption may include simple particle entrapment in the nanofiber mat, which may be the exclusive mechanism if the fluid containing the nanoparticles to be adsorbed is not a solvent for the nanofibers in the nanofiber mat.

In one embodiment, the QDE or NPE process can be considered to be a reversible process. In this embodiment, QDs/nanoparticles are adsorbed to polymer nanofiber surface because of the solvent swelling effect (i.e., the opening up of the polymer network) and the Brownian motion (i.e., the migration of the particles to polymer surface/subsurface). This process consumes particles until the particle concentration in solution reaches the solvent/polymer equilibrium state at interface. Because of this equilibrium state, one expects that a subsequent process of immersing a QD-loaded polymer nanofiber mat in a pure solvent brings the particles out from the polymer nanofiber materials. Such process is shown diagrammatically in FIG. 5 and has been repeatedly demonstrated as shown in FIG. 6.

Figure 5:
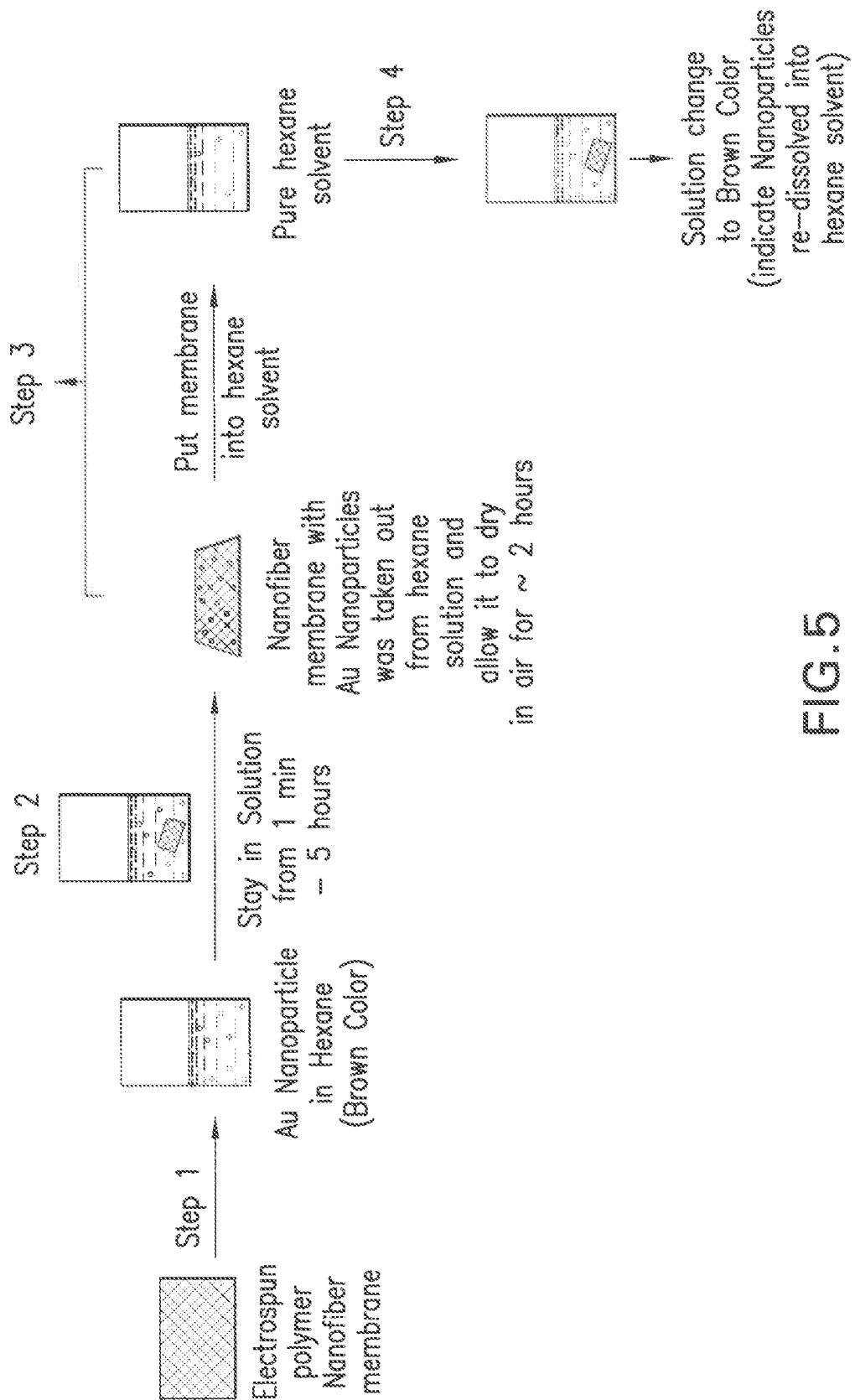
FIG. 5 is schematic depicting the QDE or NPE adsorption and desorption process of QDs.

In the process shown in FIGS. 5 and 6, Au nanoparticles (NP) of 2 nm in size were adsorbed onto a polymer nanofiber mat during a QDE process and released back to solvent in desorption/de-attachment process. A small amount of a polymer dissolving solvent such as for example di-methyl formamide (DMF) helped facilitate the desorption process for QDs. Nanofiber mats of the invention can have small enough pore sizes to be able to effectively filter out (or capture) nanoparticulate materials including quantum dots. Thus filtering a suspension of the nanomaterial through even a nanofiber mat that does not swell in the solvent, can capture and concentrate nanoparticles. These nanofiber mats (as discussed below) can then be used to dispose of the nanomaterials safely and in specific applications the nanomaterial recovered from such filters may still be useful.

Nanoparticle Embedment Application Areas 1.0 Nanomaterial Transportation

Currently, one common transportation method for transporting nanomaterials is in solution in order to minimize particle agglomeration as NPs are normally coated with surfactant layer that are compatible with certain solvent. However, the handling of NPs colloidal suspension poses two significant safety concerns. One safety concern is the unknown toxicity of the nanomaterial and the consequences when there may be an accidental spill/or breakage of the shipping bottle in which the nanomaterial will leak out generating a safety hazard. Another safety concern is with the organic solvents that are used to carry the nanoparticles. Such organic solvents are normally are considered to be themselves to be toxic chemicals.

By using the electrospun nanofiber materials as a carrier, in one embodiment of the invention, these problems will likely be solved. Polymer nanofiber material can be used as a sorbent for the nanoparticles. The nanoparticles can be carried in a solid form without solvent. TEM microscopy data shown above confirms that polymer matrix can serve as a space separator for the nanoparticles to prevent aggregation or conglomeration.

There are a number of advantages which are afforded in this embodiment where nanostructures are used. These advantages include:
 low cost material,
 low safety hazard, and
 easier transportation.

In this embodiment, the entrapment of the particles relies in part on the swelling of the nanofiber mat. In other applications, the nanofiber mat can act merely as a filter to trap the nanoparticles from the solution being filtered. These applications are not as advantageous as those where the nanofiber mat material is chosen to be reactive with the solution. In the case where the nanofiber mat material is not reactive with the solution containing the nanoparticles, one expects some degree of agglomeration of the nanoparticles as the filtration continues. The agglomeration may be deleterious in some transportation applications, unless recovery of the nanoparticles provides a mechanism for individual release of the nanoparticles from the nanofiber filter.

2.0 Nanomaterial Waste Recovery and Disposal

Waste Recovery:

Despite the fast development of nanoparticle (NP) research, the cost of making well defined, uniform nanomaterial still remains high. Accordingly, there is a need to recover the NPs or QDs in the production and application process. Polymer nanofiber structures can be used as a NP or QD waste recovery material. One example of this application is the collecting of nanoparticles in a rinsing solutions from a reaction vessel after synthesis of the NPs or QDs. Such rinsing solutions normally contain significant amount of the nanomaterials, especially for high concentration synthesis. A polymer nanofiber mat in one embodiment of the invention is inserted into the rinse solution containing the NPs or QDs, and adsorbs the nanoparticles. The procedure described with regard to FIG. 5 can be used to reclaim the nanoparticles.

This reclamation would offer the following advantages:
 reduce manufacture cost, and
 easy to use.

In this embodiment, the entrapment of the particles relies in part on the swelling of the nanofiber mat as described above. In other waste recovery applications, the nanofiber mat can act merely as a filter to trap the nanoparticles from the solution being filtered. These applications are not as advantageous as those where the nanofiber mat material is chosen to be reactive with the solution. In the case where the nanofiber mat material is not reactive with the solution containing the nanoparticles, one expects some degree of agglomeration of the nanoparticles as the filtration continues. The agglomeration may be deleterious in some transportation applications, unless recovery of the nanoparticles provides a mechanism for individual release of the nanoparticles from the nanofiber filter.

Figure 7:
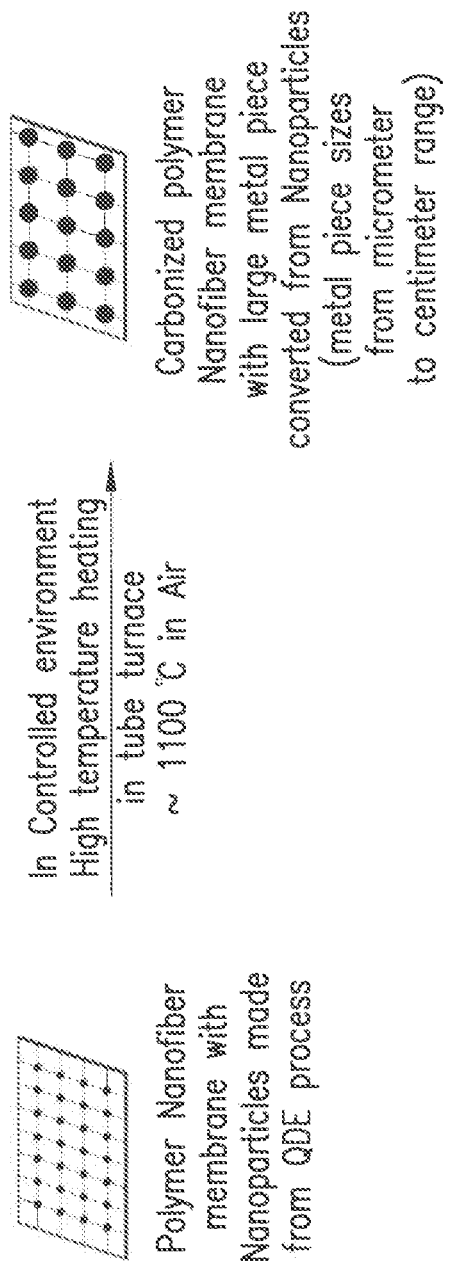
FIG. 7 is schematic depicting the nanomaterial waste disposal using the QDE or NPE process.

Waste Disposal:

Although the toxicology of many nanomaterial NPs or QDs is unknown, it is expected to be high particularly because their high reactivity and ultra small dimension. A process converting the small nanoparticles to larger bulk materials would significantly reduce the toxicity of the material. In one embodiment of the invention, a QDE process is used for nanomaterial waste disposal as illustrated in FIG. 7.

This process involves QDE particle intake to a polymer nanofiber structure and subsequent calcination procedure to melt the nanoparticles. The process is relatively simple and does not involve complicated procedures and expensive equipment.

In this embodiment as discussed above, the entrapment of the particles relies in part on the swelling of the nanofiber mat. In other waste disposal applications, the nanofiber mat can act merely as a filter to trap the nanoparticles from the solution being filtered. Since recovery of the nanoparticles in this application is not a concern, the use of a nanofiber mat material chosen to be reactive with the solution is not a critical concern.

Nanomaterial Waste Recovery and Disposal Example:

Nanoparticles: Au 2-nm core-shell nanoparticles in hexane, of a dark brown color. Polymer nanofiber: Poly (Acrylonitrile) (PAN) electrospun nanofibers, of a white color. PAN was electrospun into nanofiber membrane form and was placed into the Au 2-nm nanoparticle solution for 2-4 hours for QDE process. At the end of this QDE process, the nanofiber mat changed to dark brown color, indicating nanoparticle absorption onto the membrane. The nanoparticle loaded PAN nanofiber membrane was then placed in tube furnace and underwent a calcination at 450-600° C. in air for 2 hours. During this heating process, the surface organic capping molecules on the nanoparticle burned out, leaving the Au nanoparticles in an agglomerated form.

Advantages of this process include:
 low cost polymer nanofiber material,
 low cost waste processing procedure, no expensive equipment needed, and minimization of the possibility of the nanomaterial reintroduction into environment when using conventional waste disposal technique (solvent evaporation and burning).

Advantages of Using Nanofibers Versus Polymer Thin Film.

Although polymer thin film material can in theory serve for same purpose, there are a few significant advantages for a polymer nanofiber structure as compared with thin film materials, which include:

Higher surface area. Because of the small fiber diameter, more surfaces can be access by nanoparticles; and Nanofiber packing structure in mat. In the QDE process for thin film materials, the NPs/QDs can only access the surface/subsurface of the thin film material. For electrospun nanofibers, the highly porous packing structure provides a much larger accessible surface for QDs/NPs to be attached to for the same amount of material.

3.0 Luminescence Nanostructures

Solid state lighting (SSL) refers to a type of lighting that utilizes light-emitting diodes (LEDs), organic light-emitting diodes (OLED), or polymer light-emitting diodes (PLED) as sources of illumination rather than electrical filaments or gas. Commercial available SSL devices normally consisted of the LED surrounding by phosphors composed of the particles usually larger than 2 mm. While the phosphor material presents good luminescence properties, there are problems of low efficiency and poor spectral quality due to the limited number of wavelength. Quantum dot materials have become strong candidates for fabrication SSL materials as their highly fine tunable optical properties due to the small particle sizes, normally in the range of 1-10 nm.

Quantum dots are nanoparticles whose dimensions have an order of magnitude equivalent to or smaller than the size of an electron at room temperature (deBroglie wavelength). When the size of the quantum dot is roughly the same or smaller than the deBroglie wavelength of an electron, then a potential well is created that artificially confines the electron. The size of this potential well determines the quantized energy levels available to the electron, as described in the "particle-in-a-box" solution of basic quantum mechanics. Since the energy levels determine the fluorescent wavelengths of the quantum dot, merely changing the size of the quantum dot changes, to a first approximation, the color at which the quantum dot radiates visible light. Thus, the quantum confinement effects of the quantum dots directly influence the light emitted from the respective quantum dot, and a broad spectrum of colors may be achieved by assembling quantum dots of different sizes.

A typical quantum dot includes a nanocrystalline core that may be surrounded by a shell of an inorganic material with a higher band gap. This structure is capped with an external organic layer that ensures compatibility with various solvents. In this context, the entire assembly (i.e., nanocrystalline core, shell of higher band gap material, and organic capping layer) is referred to collectively as a quantum dot. A representative example of such quantum dots consists of a cadmium selenide nanocrystalline core surrounded by a zinc sulfide shell and capped with organic ligands such as trioctylphosphine oxide. Such core shell structures are sold by Evident Technologies of Troy, N.Y.

The nanocrystalline core of quantum dots may be fabricated from a variety of materials including but not limited to at least one of silicon, germanium, indium phosphide, indium gallium phosphide, indium phosphide, cadmium sulfide, cadmium selenide, lead sulfide, copper oxide, copper selenide, gallium phosphide, mercury sulfide, mercury selenide, zirconium oxide, zinc oxide, zinc sulfide, zinc selenide, zinc silicate, titanium sulfide, titanium oxide, and tin oxide, etc. Of particular utility to the invention are quantum dots having a core of at least one of CdSe, InGaP, InP, GaP, and ZnSe. The optical properties of quantum dots are produced by this nanocrystalline core.

Quantum dots are commercially available as colloidal dispersions in low dielectric constant (low-K) organic solvents such as toluene. However, quantum dots experience mutual attraction and can agglomerate, which may disrupt their quantum behavior and change their performance characteristics. For example, agglomeration is known to reduce the light emission efficiency of quantum dots and is known to cause red-shifts in emission frequency due to energy transfer to larger dots formed as a result of agglomeration. See J. Rodriguez-Viejo, K. F. Jensen, H. Mattoussi, J. Michel, B. O. Dabbousi and M. G. Bawendi, *Applied Physics Letters*, vol. 70 (1997), no. 16, page 21, the entire contents of which are incorporated herein by reference. Due to the sensitivity of the human eye to slight color variations, particle agglomeration can have a significant impact on the quality of light from an illumination source. In the extreme, agglomeration can lead to quenching of photoluminescence from quantum dots.

Figure 8A:
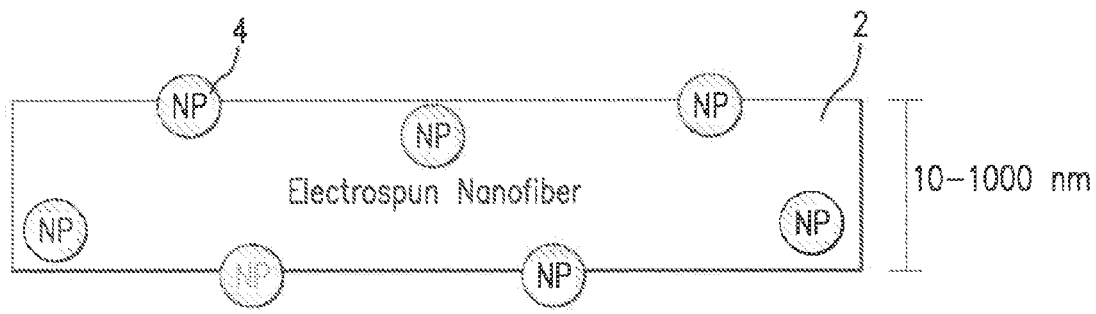
FIG. 8A is schematic depicting the disposition of luminescent compounds inside a volume of a fiber, according to one embodiment of the present invention.
Figure 8B:
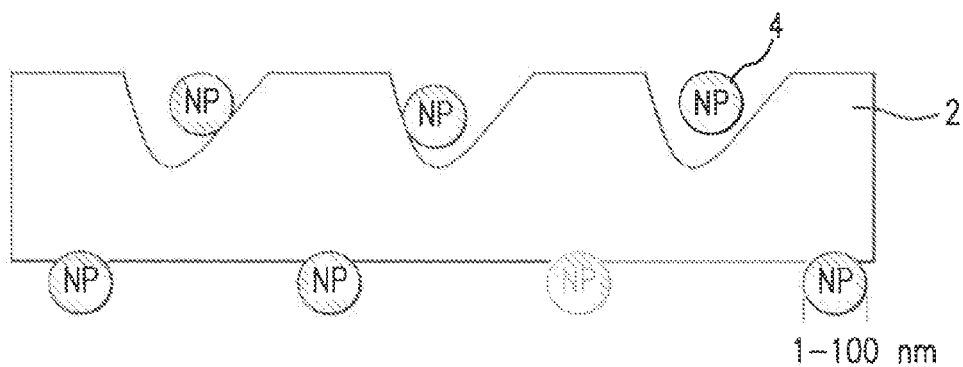
FIG. 8B is schematic depicting the disposition of luminescent compounds on or near the surface of a fiber, according to one embodiment of the present invention.
Figure 8C:
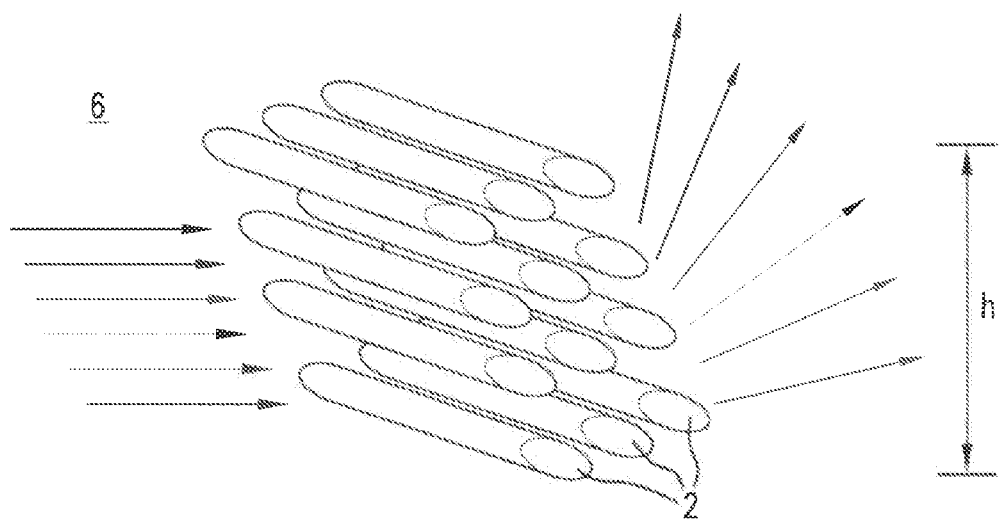
FIG. 8C is schematic depicting a fiber mat, according to one embodiment of the present invention, in which the fiber mat in total serves as an optical scattering center.

FIGS. 8A and 8B are schematics depicting a light stimulable fibers (LF) 2 including for example a luminescent particle 4 (i.e., one of the compounds disclosed below) disposed either on the surface or in the bulk of the nanofiber. More specifically, FIG. 8A is schematic depicting the disposition of luminescent particles 4 (e.g., light stimulable particles such as quantum dot semiconductor materials or nano-phosphors) inside a volume of a fiber 2, which in FIG. 8A is depicted as a nanofiber. FIG. 8B is schematic depicting the disposition of luminescent particles 4 on or near the surface of a fiber 2, which in FIG. 8B is also depicted as a nanofiber. FIG. 8C is schematic depicting a fiber mat 6, according to one embodiment of the invention, in which the fiber mat 6 in total serves as an optical scattering center. In this configuration, according to one embodiment of the invention, stimulable particles (while not explicitly shown) are disposed in association with the nanofibers 2 throughout the fiber mat thickness h. The nanofibers 2 cumulatively provide scattering sites for excitation (or primary) light, thereby in one embodiment of the invention enhancing the probability of interaction between the pump source light and the stimulable particles 4.

Figure 8D:
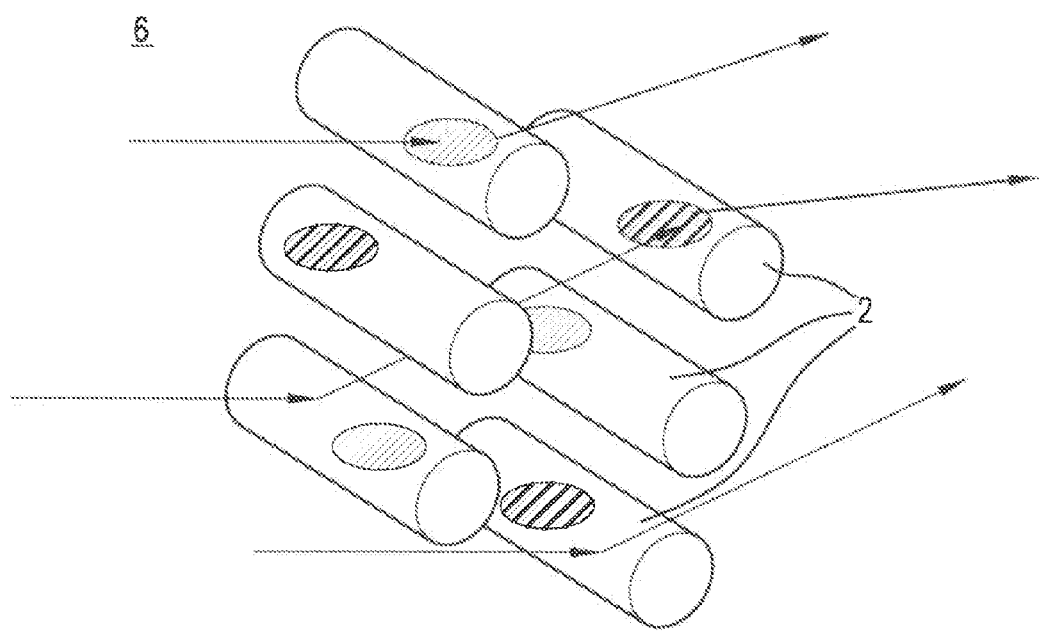
FIG. 8D is schematic depicting a fiber mat, according to one embodiment of the present invention, in which the fibers serve as individual scattering centers.

FIG. 8D is schematic depicting a fiber mat 6, according to one embodiment of the invention, in which the fibers 2 are shown as individual scattering centers. The nanofibers 2 individually provide scattering sites for excitation (or primary) light, thereby in one embodiment of the invention enhancing the probability of interaction between the pump source light and the stimulable particles 4.

Hence, in various embodiments of the invention to be explained in greater detail below, there is provided a device including the fiber mats shown for example in FIGS. 8C and 8D for stimulable emission from a fiber mat. The fiber mat 6 includes nanofibers having an average fiber diameter in a range between 100 and 2000 nm, and plural light stimulable particles disposed in association with the nanofibers. The stimulable particles 4 can produce secondary light emission upon receiving primary light at a wavelength $\lambda$. The average fiber diameter is comparable in size to the wavelength $\lambda$ in order to provide scattering sites within the fiber mat for the primary light.

The average fiber diameter is in a range between 100 to 2000 nm, or more suitably between 300 nm to 600 nm, or more suitably between 400 nm to 500 nm. The average fiber diameter is in a range of 0.50 to 1.50 of the wavelength $\lambda$, or more suitably in a range of 0.9 to 1.10 of the wavelength $\lambda$.

The wavelength λ is in a range between 100 and 2000 nanometers, or more suitably between 400 and 500 nanometers. The fiber mat 6 has a thickness in a range between 0.1 and 2,000 microns, or more suitably in a range between 1 to 500 microns.

In various embodiments of the invention, the stimulable particles 4 include for example besides or in addition to the quantum dot materials listed above nano-phosphors. Nano-phosphors such as for example in the list below and others are suitable for the invention. Examples of suitable nanophosphors include, but are not limited to:

1. Rare-Earth doped metal oxide such as $Y_2O_3$:Tb, $Y_2O_3$:$Eu^{3+}$, $Lu_2O_3$:$Eu^{3+}$, $CaTiO_3$:$Pr^{3+}$, CaO:$Er^{3+}$, (GdZn)O:$Eu^{3+}$;
2. Rare-Earth doped yttrium aluminum garnet (YAG) such as YAG:$Ce^{3+}$;
3. Rare-Earth doped zirconium oxide such as $ZrO_2$:$Sm^{3+}$, $ZrO_2$:$Er^{3+}$;
4. Rare-Earth doped vanadate ($YVO_4$:Eu) and phosphate $(La,Ce,Tb)PO_4$;
5. Doped materials consisting of a host matrix (e.g., $Gd_2O_3$, $GdO_2S$, PbO, ZnO, ZnS, ZnSe) and a dopant (Eu, Tb, Tm and Mn); and
6. Metal-doped forms of zinc sulfide and zinc selenide (e.g., ZnS:$Mn^{2+}$, ZnS:$Cu^+$).

Of particular utility to the invention are nanonphosphors including at least one of rare-Earth doped YAG, doped ZnS, and doped ZnSe.

Figure 8E:
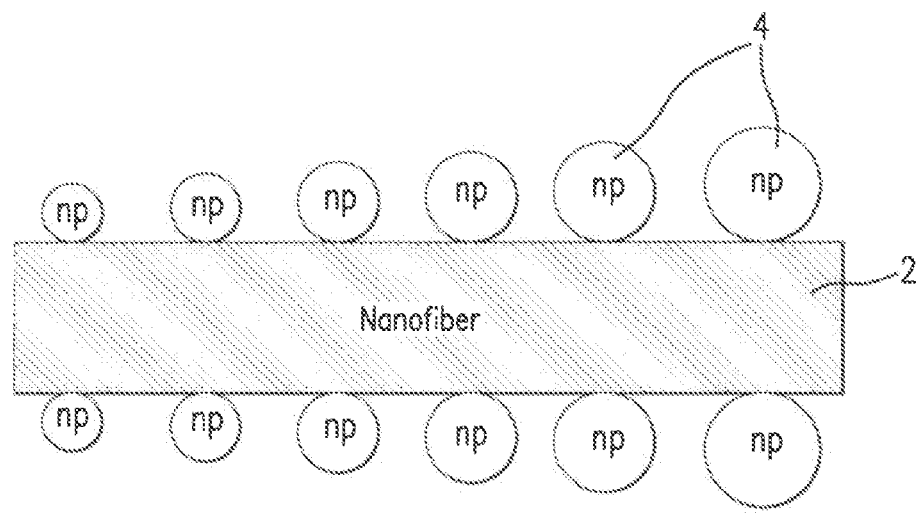
FIG. 8E is schematic depicting a fiber mat, according to one embodiment of the present invention, in which the fibers have a distribution of different size quantum dots on the fibers.

Further, as discussed in more detail later, the stimulable particles 4 can include a plurality of color-distinctive light emitters (i.e., a distribution of different sized quantum dots or a distribution of nano-phosphors) which produce respective secondary light emissions from the primary light and thereby form a resultant white light having a color rendering index greater than 70, or greater than 80. FIG. 8E is schematic depicting a fiber mat 6, according to one embodiment of the invention, in which the fibers have a distribution of different size quantum dots on the fibers.

In one embodiment of the invention, by dispersing the stimulable particles 4 on a high surface area medium such as for example a fiber mat of nanofibers, the emission efficiency of a fiber mat 6 containing the nanofibers 2 and the stimulable particles 4 (e.g., the quantum dots) is increased above that achieved with planar packing of the luminescent particles are dispersed in a film. As a result, in one embodiment of the invention, such a nanofiber mat structure can capture, with a higher efficiency than if the quantum dots were dispersed in a film, photons emitted by an LED and re-radiate at visible wavelengths with higher intensities than would be possible with planar packed luminescent particles. Furthermore, the use of nanofibers having surface pores enhances this effect, as discussed by example later.

While not limited to any particular theory, light scattered from the fibers 2 depends on the fiber diameter, size of pores on the fiber, light wavelength, orientation of the fiber to the light and the refractive index of the fibers. Polymers of the fibers have real refractive indices in the range between 1.3 to 1.6. Examples of the light scattering efficiency curves for long fibers of slightly absorbing materials (and which may act in a similar manner as the nanofiber structures of the invention) have been detailed previously by Van de Hulst, in Light Scattering by Small particles, Dover, 1957. In that earlier work, for an incident light of 300 nm, the maximum light scattering has a size parameter (π times fiber diameter/wavelength) of 3.14 and a scattering efficiency (Q) of $Q_1$=4.2. For incident light at 600 nm, the size parameter is 1.6 and $Q_1$=2. Therefore, the shorter wavelength light (expected to be used frequently in the invention) is twice as likely of being trapped in the mat of fibers than the longer wavelength light. An alternative explanation of this phenomenon is that, on average, the optical path length (OPL) of light at 400 nm through an appropriately designed nanofiber material is longer than the OPL of 600 nm light. The implications of this phenomena as applied to the invention are that an enhancement of light emission may be obtained from the light scattering characteristics of the fibers in the fiber mat (i.e., each fiber acting as a scattering center, and the mat of fibers acting as a medium to more effectively confine the excitation light in the fiber mat medium permitting a higher probability that the excitation light would interact with a light emitter during its residence in the fiber mat.

For example, in the invention a typical excitation frequency is blue light at 450 nm. In order to produce white light, the structure will need to emit radiation over a broad range of frequencies from 450 nm to 800 nm. By fabricating a nanofiber structure in which the average diameter of the nanofibers 4 in the mat 6 is roughly the same as that of the excitation source (i.e., 450 nm), the excitation frequency can be effectively trapped in the nanofiber structure by light scattering (i.e., OPL of the excitation source is long). This increases the likelihood that the excitation source will initiate fluorescence and produce white light. In contrast, the longer wavelength emissions produced by fluorescence of the luminescent compound will be scattered less effectively by the nanofibers in the fiber mat, and are more likely to emerge from the fiber mat structure with minimal scattering. Under these conditions, the light scattering/photonic properties as a function of wavelength and fiber diameter are improved.

In addition to the light scattering effects of the nanofibers, surface pores with dimensions on the order of 150 nm or larger will also scatter light to different degrees depending upon wavelength. Such surface pores can be fabricated in electrospun nanofibers using a solvent mixture of high and low dielectric constant solvents, as described above. The scattering efficiency of such pores on the nanofibers can be readily calculated using methods described by van der Hulst in Light Scatter by Small Particles (Dover, 1957) and Bohren and Huffman in Absorption and Scattering of Light by Small Particles (Wiley, 1983). For example, a pore with a diameter of 150 nm completely embedded in poly(methyl methacrylate) has a scattering efficiency of 0.334 at 400 nm, but only 0.062 at 750 nm. Since the pore size can be smaller than the fiber diameter, multiple pores can be placed on each fiber, as shown in FIG. 2, to provide even greater light scattering difference between wavelengths. This effect mirrors that of the nanofibers described above and creates a synergy in which shorter wavelengths are scattered much more effectively by the porous nanofiber than lower wavelengths. This wavelength-dependent, light scattering efficiency differential, which is due to both surface pores and nanofibers, will be referred to as a collective property of the nanofiber in the discussion below. This property of porous nanofibers can be advantageous in applications such as lighting, as discussed below.

In one embodiment of the invention, the fiber mat 6 includes a number of nanofibers layers (as shown in FIG. 8C). The nanofibers 2 of these layers serve individually as scattering centers for the incident excitation light. Typically, the nanofibers have an average diameter that is approximately that of the wavelength of the excitation source (i.e., from 200-500 nm). Furthermore, the number of layers in the fiber may typically form a thickness for the fiber mat 6 in a range of 0.1 to 2,000 microns, although thinner values such as for example 0.01 microns and thicker values such as for example 3,000 microns are suitable. The thinner layers may not be as likely to "capture" the incident excitation light, and the thicker layers may substantially scatter the induced light from the quantum dots.

In one embodiment of the invention, stimulable particles 4 can be applied to the roughened electrospun fibers 2 as the fibers are coalescing into a resultant fiber mat 6. Here, the stimulable particles 4 are attached to the electrospun fiber during the electrospinning process. In this embodiment, the stimulable particles 4 become positioned at or near the surface of the nanofiber. The process is similar to the general techniques described above for electrospraying nanofibers under controlled conditions. Stimulable particles 4 are attached onto a surface of the electrospun fibers before the electrospun fibers have dried. The stimulable particles 4 can be introduced by an electrospray beam directed to a position removed from an electrospraying tip electrospinning the polymer solution.

Low agglomeration of stimulable particles 4 can be achieved in this embodiment by separating the nanofiber formation and light stimulable particle attachment steps. This can be achieved by introducing for example stimulable particles 4 (such as from an electrospray solution) into a region where an emerging nanofiber is drying. In an electrospray introduction technique, submicron droplets of the stimulable particle suspensions are generated by electrostatically disrupting a droplet of a solvent (such as for example toluene) containing the quantum dots. The electrosprayed droplets are highly charged (usually positively charged) and do not aggregate due to repulsion of similar charges during their passage to the surface of the polymer nanofiber 6 that can be carrying an opposing electrical charge.

Since the nanofiber is drying during ejection from the needle, the location of the electrospray controls the penetration of the stimulable particles 4 into the nanofiber 2. For example, if the electrospray beam is moved closely to the electrospraying tip, the nanofibers will likely be softer since they will contain more solvent and the stimulable particles 4 will embed deeper into the fiber. Alternatively, if the electrospray beam is moved away from the electrospraying tip and closer to the collector, the nanofibers will be drier and the stimulable particles will be restricted to the surface. Other parameters such as the solvent used to disperse the stimulable particles may also influence the penetration depth of the electrosprayed quantum dots.

Regardless of the application technique for introducing the stimulable particles 4 into the nanofiber 2, to verify the effect of appropriately sized fibers in a light stimulable structure of the invention (i.e., fibers sized to a diameter that is close to the excitation frequency wavelength), a fiber mat having nanofibers with an average diameter of 450 nm and a polymer film containing no nanofibers were prepared. Both materials had equal amounts of quantum dots (i.e., luminescent compounds).

Figure 9:
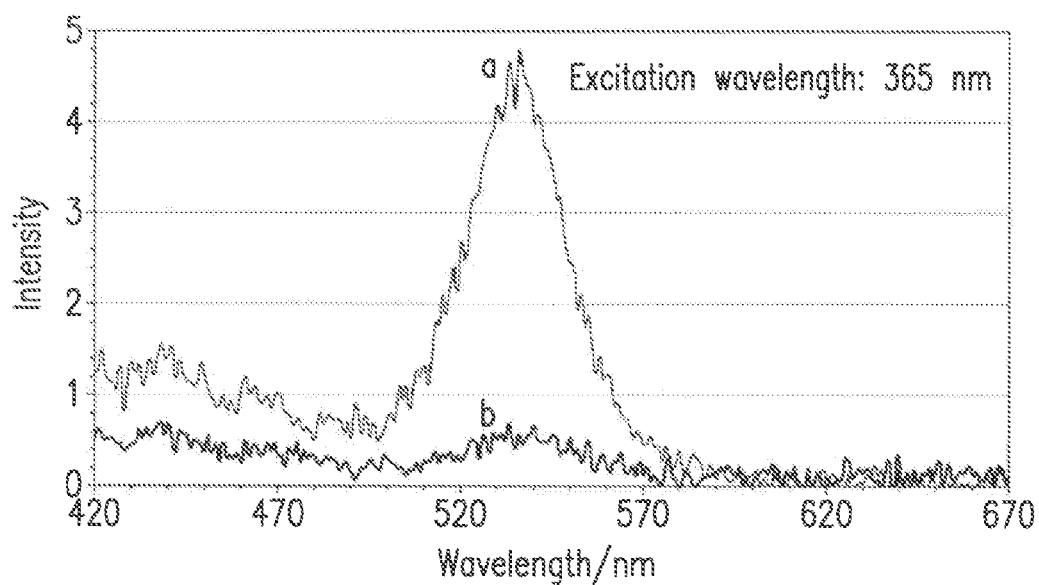
FIG. 9 is the resultant light spectrum from two samples, a fiber mat in curve "a" and a polymer film in curve "b" containing no nanofibers, each having equal concentrations of quantum dots.

FIG. 9 is the resultant light spectrum from two samples. Here, the comparison is between a quantum dot infiltrated nanofiber structure without intentional porosity and quantum dot attachment to a surface thin film. When the quantum dots are dispersed in the nanofibers, the intensity of fluorescent emission increased by roughly an order-of-magnitude as compared to a polymer film sample, as indicated by the intensity of light emissions of the 540 nm peak in the corresponding spectrum shown by curve "a" in contrast to curve "b" of the polymer film sample. This improvement in performance is believed to be due to the diffuse light scattering nature of the nanofiber material derived from differences in structure between a nanofiber matrix and a solid film, as explained above. That is, the nanofiber mat of the invention permits higher energy light (e.g., Blue or UV excitation) to be scattered more efficiently than lower energy light (e.g., Red light) which creates a longer optical path length (OPL) through the material for high energy light. Since the OPL is higher, the high energy light is more likely to be reflected within the nanofiber structures increasing the probability that it can be captured by the quantum dots to produce higher intensity light emission from the quantum dot containing medium. It is likely that agglomeration did not reduce intensity in the solid film because there is little red shift seen in the spectra for the solid film (i.e., curve "b"). Moreover, using transmission electron microscopy (TEM) and UltraViolet-Visible Spectroscopy, the quantum dots were found to be uniformly dispersed throughout the fiber mat, regardless of size.

Agglomeration can become an issue for luminescent quantum dot devices even at low concentrations, since small particles often experience electrostatic attraction. However, the invention utilizes the high surface area nanofibers to reduce particle agglomeration presumable due to the ability of the high surface area nanofiber to accommodate large amounts of nanoparticles. Moreover, the surface porosity or surface roughness provides for sites where the quantum dots in this luminescent device application and the nanoparticles more generally in the other applications can reside without aggregation.

In one embodiment of the luminescent device, agglomeration is undesirable since it results in non-uniformity in the dispersion of the luminescent compound in the resultant fibers. Agglomeration can change the color uniformity of the resultant light emissions. In addition, agglomeration also degrades the optical properties of the luminescent compound by causing a red-shifting of the emission frequency and a reduction of emission intensity due to quenching.

The size distribution of the nanoparticles can be controlled by managing a number of parameters such as for example: changing an organic phase of a solvent system, changing a temperature at which the nanoparticles are formed, alternating reactant concentrations used to form the nanoparticles, adding a protective shell layer, changing the capping molecule chemistry, adding surfactants to control a coagulation of the material from which the nanoparticles are to be formed, applying an electrical or magnetic field during particle nucleation, applying acoustical energy during the formation of the nanoparticles, etc.

A shell that is typically a metal or wide band-gap inorganic material can be placed around the nanoparticle (i.e., the quantum dot) to chemically stabilize the nanoparticle. A coordination sphere or surface capping layer consisting of surfactants or other organic ligands can be included around and attached to the outside of the shell to promote solution and prevent agglomeration. Such ligands can help prevent agglomeration of nanoparticles when the nanoparticles are created or used in a dry state. Alternatively, a separation method such as electrophoretic separation can be used after the particle nucleation to achieve a desired particle distribution.

Figure 10:
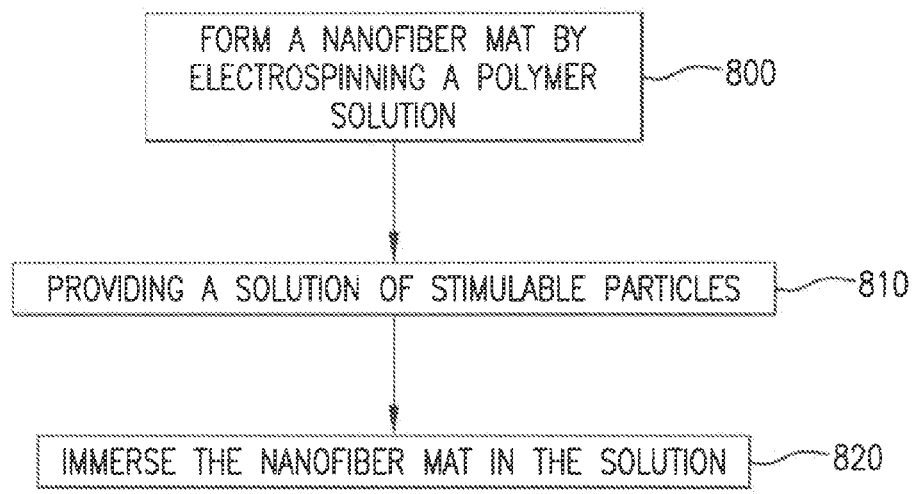
FIG. 10 is a flow chart illustrating a method for forming a luminescent device according to an embodiment of the present invention in which luminescent particles are attached to the electrospun fiber after the electrospinning process.

In one embodiment of the invention, as discussed above, light stimulable particles such as for example quantum dots can be applied to the fiber mats after electrospinning. This embodiment is illustrated in FIG. 10. According to this embodiment of the invention, a fiber mat is formed in 800 by electrospinning methods such as for example the techniques described above. At 810, a solution containing the stimulable particles 4 is provided. At 820, the nanofiber mat 6 is immersed into the solution. The solution is selected such that the fiber mat does not dissolve but slightly swell the polymers existing in the fiber mat 6.

During the embedment process, the polymer nanofibers may swell due to the solvent. This expansion of the fibers in the network also expands the spaces between the fibers, thus opening the network spaces to allow the particles to move in between. The particles can move to the fiber surface due to the Brownian motion. The particles can be disposed in the surface pores of the nanofiber mat, when surface pores are included in the fiber mat 6. The fiber mat 6 may be immersed in the solution for a period of 1 minute to 72 hours and may be rinsed with a solvent for 0-60 seconds to ensure the removal of any loosely attached surface particles. The fiber mat 6 may then be placed onto a support and allowed to completely dry under room temperature before use. Further, the nanoparticle and quantum dot solutions described above and the procedures describe above can be used for entrapment of the nanoparticles and quantum dots in the porous nanofibers.

Studies using bulk polymer composed with quantum dots prepared by spin coasting a polymer/quantum dot composite solution have been reported. Studies using polymer/quantum dot composite nanofiber made by electrospinning of polymer/quantum dot composite solution have also been reported where the high surface area of the nanofiber structure was also used to produce quantum confinement effects. However, the composites prepared by these two methods have an agglomeration issue with the quantum dots in the composite. The agglomeration leads to reduced quantum efficiency of the resulting materials.

The QDE and NPE techniques of the invention here can produce polymer/quantum dot or nanoparticle composite materials after nanofiber after nanofiber production, by absorption of individual particles onto surface and subsurface of the polymer materials. Further, the roughened and porous surfaces demonstrated above can also help to dramatically reduce the aggregation of the quantum dot in the composite form, thus leading to high quantum efficiency of the resulting material. One example for fabrication using a QDE technique is given below.

Luminescent Polymer QDE Example:

Poly(methylmethacrylate) (PMMA). Quantum dots: CdSe/ZnS quantum dot in hexane. PMMA nanofibers membrane was first electrospun using the apparatus and conditions listed in fabrication procedure described above. The electrospun structure was left in the ambient condition for complete solvent evaporation for 24 hours followed by immersing into the CdSe/ZnS quantum dot/hexane solution for a period of 1-60 minutes for QDE process. At the end of the process, the membrane was taken out from solution and left in ambient conditions for drying for 30 minutes before optical characterization.

In one embodiment, a QDE fabricated membrane structure showed 3.5 times higher quantum efficiency than in-the-dope polymer/quantum Dot composite nanofibers. Dope refers to quantum dot/polymer mixture solution. In-the-dope nanofibers refer to the nanofibers electrospun from mixture of polymer and quantum dots. As a result, quantum dot normally RESIDE inside of the polymer nanofibers. The 3.5 times higher quantum efficiency difference of the QDE fabricated membrane structure of the invention here may be due to several factors, including: a) Quenching of the QDs by the solvents used for in-the-dope fibers; b) Damage of the QD coordination sphere by the electrospinning process for in-the-dope fibers; c) In-the-dope fibers tends to have high absorption of light by the nanofiber material than QDE fibers.

Figure 11:
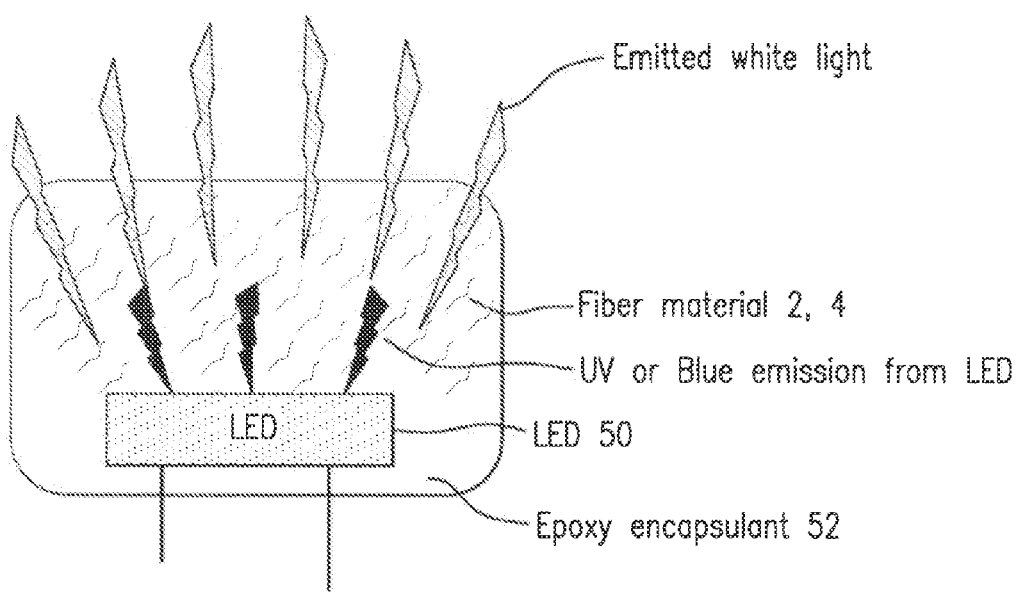
FIG. 11 is a schematic depicting according to one embodiment of the present invention a configuration in which a light emitting diode (LED) couples light through an encapsulant to the fibers including the luminescent materials.
Figure 12:
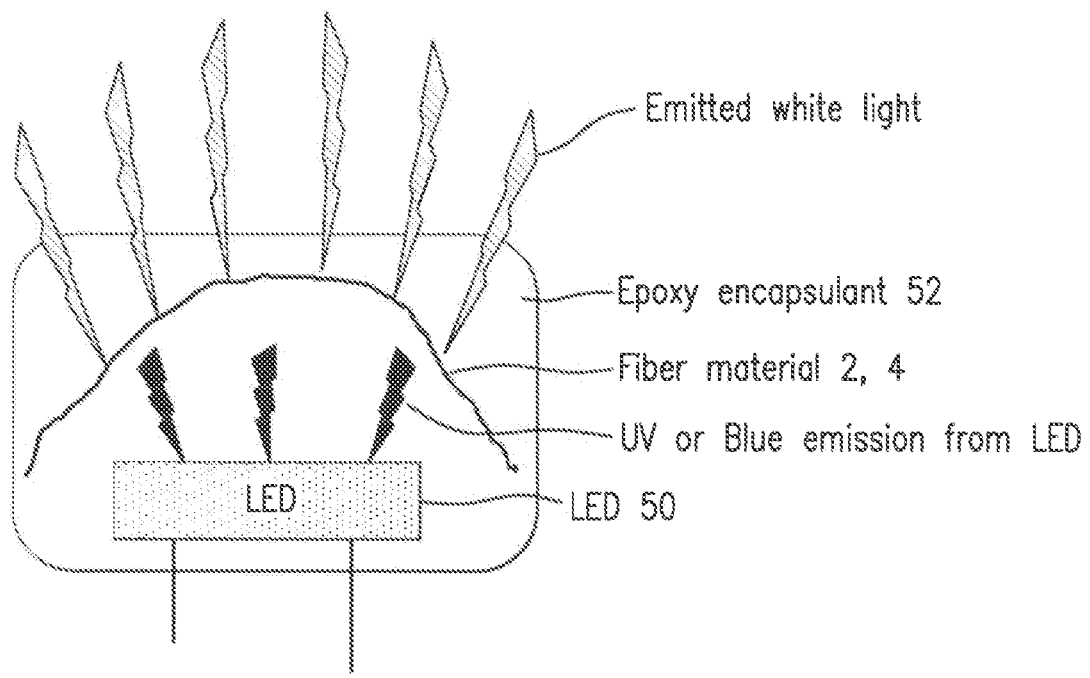
FIG. 12 is a schematic depicting according to one embodiment of the present invention a configuration in which a light emitting diode (LED) couples light through an encapsulant containing therein fibers including the luminescent materials.

Finally, the QDE/nanofiber structures forming luminescent materials can be included in an encapsulant such as for example an epoxy matrix. FIG. 11 is a schematic depicting according to one embodiment of the invention a configuration in which a light emitting diode (LED) couples light through an encapsulant to the fibers including the luminescent or light stimulable particles. More specifically, FIG. 12 shows LED 50 emitting UV or blue light through a nanofiber materials 2, 4 having a certain distribution of quantum dots (not shown). The UV or blue light emitted by LED 50 constitutes the incident light for the nanofiber materials 2, 4. The stimulable particles 4 (e.g., the quantum dots) absorb the incident light, and depending on their properties, emit white light. The fiber mat materials 2, 4 are encapsulated, for example, in an epoxy encapsulant 52. The epoxy 52 may encapsulate both the LED 50 and the fiber mat materials 2, 4, either completely or partially. The fiber mat materials 2, 4 may include quantum dots of sizes varying from approximately 1.5 nm to 10 nm to produce a light emission across the desired portion of the visible spectrum. The concentration of various quantum dots (and/or size distribution) is controlled, in one embodiment of the invention, to provide high quality white light similar to solar emissions.

In other examples, a higher concentration of red emitters than blue emitters may be chosen for other non-white light applications. Thus, the invention permits both monochromatic and color-distinctive luminescent structures to be made by the respective placement of the appropriate quantum dot light emitter in respective areas of the luminescent structure. Prefabricated fiber mats of respective emission colors (i.e., white, red, blue, green, or a color combination) can be cut and placed in the respective areas, such that a common light source coupled for example through a fiber optic cable would produce different light from the respective areas.

According to another embodiment of the invention, the mat may be directly placed on the surface of the LED 50 before the encapsulation with epoxy. This placement may reduce energy losses from absorption of UV in the epoxy. Stimulable particles 4 such as the quantum dots may be concentrated near the LED for a maximum absorbing effect. Further as part of the bonding of the nanofiber mat to the LED, interstices in the fibers may be filled with a low refractive index polymer, such as silicone, to optimize the scattering effects required to trap the UV light.

FIG. 11 is a schematic depicting according to one embodiment of the invention a configuration in which a light emitting diode (LED) 50 couples light through an encapsulant 52 containing therein fibers 2 including the stimulable particles 4. In this embodiment, as shown in FIG. 11, the nanofiber mat including the stimulable particles 4 has been divided (e.g. chopped) and added as filler to the epoxy encapsulant 52, for example an encapsulant typically used in LEDs. An alternative approach is to disperse the fibers by shear of the epoxy. Because the nanofibers may be made small to not interfere with the visible light transparency of the clear epoxy, the optical properties of the epoxy should be unaffected.

Some advantages of the various embodiments of the invention as compared to the traditional technology include: 1) providing a luminescent material with broad spectral emission can be created by incorporating a distribution of nanoparticles into the light stimulable devices of the invention; 2) creating such a structure requires less solvent than the casting or electrophoretic methods currently in use for phosphors; 3) allows emission, transmission, and scattering properties of the luminescent material to be controlled separately through a choice of the nanoparticle (i.e., particle density, size, composition, etc.) and nanofiber geometry (i.e., length, diameter, porosity, etc.); 4) allows for more efficient operation of the photoluminescent converter due to higher surface area and control of the fiber geometry; and 5) provides a more convenient process to handle and process nanoparticles in finished devices than alternative approaches.

4.0 Catalytic Nanostructures

Currently, platinum is one of the more commonly used catalyst metals for fuel cell systems. Despite its high catalytic activity, the cost of this precious metal is one of the main hurdles for its commercialization in transportation needs. How to design a support material with properties of high surface area, high durability which can make the most efficient use of the Pt catalyst thus becomes an important question to be addressed.

Many efforts have focused on using high-surface-area carbon materials (such as carbon black) as the catalyst support in PEMFCs. There are two major problems with this carbon loaded system. One problem is the agglomeration issue. Despite the individual particle size in the range of 1-100 nm, this catalyst support system usually suffers from particle aggregation with size range of several hundred nanometer to micrometers due to inter-particle interaction and leads to a significant decrease of the total surface area, during heating. The other problem is the sintering of the catalyst particles after heating, resulting in degradation of the catalytic activity and nanoproperties of these particles.

In this embodiment of the invention, one utilizes a porous polymer nanofiber (with diameter of 50-500 nm) as the initial catalyst support template, followed by carbonization of the polymer fiber and catalyst activation. Such polymer nanofiber material can be used as prepared and does not have agglomeration issue, thus significantly increasing the total area of catalyst loading site and minimizing the agglomeration of the particles during heating.

Figure 13:
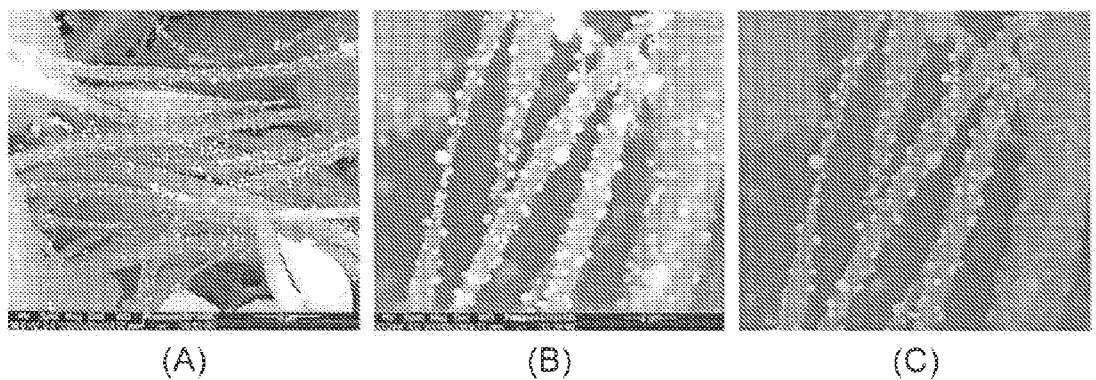
FIG. 13 shows SEM images (A and B) and EDX mapping image (C) of the PAN/Au carbon nanofibers, the white dots in (C) indicates the location of the Au nanoparticles on the carbon nanofibers.

Below is an example:

Organic Catalyst Example:

A polymer Poly(Acrylonitrile) (PAN) and a metal catalyst Pt or alloy nanoparticle with size dimension of 2-10 nm were sued. The PAN nanofiber membrane was first obtained by electrospinning from a PAN solution. The resulting membrane was then placed into Pt or alloy nanoparticle solution for 2 hours QDE process, the material is taken out of the QDE solution and leave in room air and ambient condition for completely drying of 2-4 hours. The dried membrane was then moved to programmable tube furnace for calcination. The calcination involves several steps, including heating the composite membrane in series of air, hydrogen and argon gas at temperature range of 250 C-1100° C. for a total experimental duration of the 20 hours. The resulting composite carbon nanofibers are shown in FIG. 13. FIG. 13 shows specifically SEM images (A and B) and EDX mapping image (C) of the PAN/Au carbon nanofibers, the white dots in (C) indicate the location of the Au nanoparticles on the carbon nanofibers.

In another embodiment of the invention, the QDE or NPE techniques can be used to prepare inorganic nanofiber structures as well. In this case either organic nanofibers or a sol-gel/organic blend nanofiber can be used in various embodiments. These materials, because of their organic polymer content, can be used in the QDE or NPE techniques and can be surface embedded with nanoparticles. The product can then be calcinated to yield an inorganic nanofiber with metal nanoparticles. Below is an example:

Inorganic Catalyst Example:

A polymer: Poly(vinyl alcohol) (PVA) and an inorganic additive calcium phosphate, and catalyst nanoparticles Pt or metal alloy nanoparticles are included. PVA and calcium phosphate mixture was first electrospun into a nanofiber membrane and dried at room temperature for at least 8 hours. The dried nanofiber membrane was then placed into Pt nanoparticle QDE solution for 1 hour.

The Pt nanoparticle loaded PVA/Calcium Phosphate nanofiber membrane was dried at room temperature for 8 hours to allow complete solvent removal. The dried membrane was then moved to programmable tube furnace for calcination. The calcinations involves several steps, including heating the composite membrane in series of air, hydrogen and argon gas at temperature range of 250-1100.0 for a total experimental duration of the hours.

Polymers that can be used for this purpose include but not limited to are Poly(Acrylonitrile) (for carbon substrates), Poly(vinyl alcohol), poly (ethylene oxide), poly(acrylamide), carboxymethylcellulose, poly(vinylpyrrolidone).

Inorganic additives can be used for this purpose include but are not limited to tetraethyl orthosilicate, titanium isopropoxide, calcium phosphate, zinc titanates, tungsten oxide Examples of catalyst nanoparticles include but are not limited to noble metals such as Au, Pt, Pd and binary and ternary alloy nanoparticles, such as PtAu, PdAu, PtRu, PtFe, PtVFe.

Numerous modifications and variations of the invention are possible in light of the above teachings. It is therefore to be understood that within the scope of the appended claims, the invention may be practiced otherwise than as specifically described herein.

The invention claimed is:

1. A device for stimulable light emission, comprising:
   a fiber mat including,
   nanofibers having an average fiber diameter in a range between 100 and 2000 nm and having a surface pore on at least one of the nanofibers increasing a surface area of the at least one of the nanofibers; and
   plural light stimulable particles disposed in association with the nanofibers and configured to produce secondary light emission upon receiving primary light at a visible wavelength $\lambda$; and
   said average fiber diameter being comparable in size to the wavelength $\lambda$ in order to provide scattering sites within the fiber mat for the primary light at the visible wavelength $\lambda$.

2. The device of claim 1, wherein the average fiber diameter is in a range between 300 to 600 nm.

3. The device of claim 2, wherein the average fiber diameter is in a range between 400 nm to 500 nm.

4. The device of claim 1, wherein the average fiber diameter is in a range of 0.50 to 1.50 of the wavelength $\lambda$.

5. The device of claim 4, wherein the average fiber diameter is in a range of 0.9 to 1.10 of the wavelength $\lambda$.

6. The device of claim 1, wherein the wavelength $\lambda$ is in a range between 300 and 600 nanometers.

7. The device of claim 6, wherein the wavelength $\lambda$ is in a range between 400 and 500 nanometers.

8. The device of claim 1, wherein the fiber mat has a thickness in a range between 0.01 microns and 2,000 microns.

9. The device of claim 1, wherein the fiber mat has a thickness in a range between 1 to 500 microns.

10. The device of claim 1, wherein the stimulable particles comprise luminescent particles.

11. The device of claim 10, wherein the luminescent particles comprise at least one of quantum dots and nano-phosphors.

12. The device of claim 11, wherein the quantum dots comprise at least one of silicon, germanium, indium phosphide, indium gallium phosphide, indium phosphide, cadmium sulfide, cadmium selenide, lead sulfide, copper oxide, copper selenide, gallium phosphide, mercury sulfide, mercury selenide, zirconium oxide, zinc oxide, zinc sulfide, zinc selenide, zinc silicate, titanium sulfide, titanium oxide, and tin oxide.

13. The device of claim 11, wherein the nano-phosphors comprise at least one of a rare-earth doped metal oxide including $Y_2O_3$:Tb, $Y_2O_3$:$Eu^{3+}$, $Lu_2O_3$:$Eu^{3+}$, $CaTiO_3$:$Pr^{3+}$, CaO:$Er^{3+}$, and (GdZn)O:$Eu^{3+}$, a rare-earth doped yttrium aluminum garnet (YAG) including YAG:$Ce^{3+}$, a rare-earth doped zirconium oxide including $ZrO_2$:$Sm^{3+}$ and $ZrO_2$:$Er^{3+}$, rare earth doped vanadates and phosphates including ($YVO_4$:Eu) and (La,Ce,Tb)$PO_4$, doped materials having a host matrix including one $Gd_2O_3$, $GdO_2S$, PbO, ZnO, ZnS, and ZnSe and including one of a dopant of Eu, Tb, Tm and Mn, and metal-doped forms of zinc sulfide and zinc selenide including ZnS:$Mn^{2+}$ and ZnS:$Cu^+$.

14. The device of claim 11, wherein the nano-phosphors comprise at least one of rare-Earth doped YAG, rare-Earth doped ZnS, and rare-Earth doped ZnSe.

15. The device of claim 1, wherein the stimulable particles comprise a plurality of color-distinctive light emitters configured to produce respective secondary light emissions from the primary light.

16. The device of claim 15, wherein the primary light transmitted from the fiber mat and the secondary light emissions from the fiber mat produce a resultant white light having a color rendering index greater than 70.

17. The device of claim 15, wherein the primary light transmitted from the fiber mat and the secondary light emissions from the fiber mat produce a resultant white light having a color rendering index greater than 80.

18. The device of claim 15, wherein the secondary light emissions from the fiber mat produce a resultant white light having a color rendering index greater than 70.

19. The device of claim 15, wherein the secondary light emissions from the fiber mat produce a resultant white light having a color rendering index greater than 80.

20. The device of claim 1, wherein the stimulable particles are disposed on surfaces or within a volume of the nanofibers or within the surface pores.

21. The device of claim 1, wherein the stimulable particles are entrained in the fiber mat.

22. The device of claim 1, further comprising:
a transparent encapsulant encasing the fiber mat.

23. The device of claim 1, further comprising:
a light emitting diode configured to produce the primary light.

24. The device of claim 23, further comprising:
a transparent encapsulant encasing the light emitting diode and the fiber mat.

25. The device of claim 1, wherein the nanofiber comprise at least one of organic and inorganic fibers.

26. The device of claim 1, wherein the nanofibers comprise polymers including at least one of poly(alkyl acrylate), poly(methyl methacrylate), poly(ethylene oxide), polystyrene, polysulfone, polylactides, polycarbonate, polyamides, poly(vinyl alcohol), derivatives thereof and related polymers, polysilicones, polysulfones, and combinations thereof.

27. The device of claim 1, wherein the nanofibers include additives to alter at least one of a refractive index and an electrical conductivity of the nanofibers in the fiber mat.

28. The device of claim 1, wherein the nanofibers comprise two groups of fibers.

29. The device of claim 28, wherein the two groups comprise fibers having different materials.

30. The device of claim 28, wherein the two groups comprise fibers having different average fiber diameters.

31. A lamp comprising:
a primary light source configured to emit visible light;
a fiber mat including,
nanofibers having an average fiber diameter in a range between 100 and 2000 nm and having a surface pore on at least one of the nanofibers increasing a surface area of the at least one of the nanofibers, and
plural light stimulable particles disposed in association with the nanofibers and the surface pores and configured to produce secondary light emission upon receiving light from the primary light source at a visible wavelength $\lambda$; and
said average fiber diameter being comparable in size to the wavelength $\lambda$ in order to provide scattering sites within the fiber mat for the primary light at the visible wavelength $\lambda$.

32. The lamp of claim 31, wherein the average fiber diameter is in a range between 400 nm to 500 nm.

33. The lamp of claim 31, wherein the wavelength $\lambda$ is in a range between 400 and 500 nanometers.

34. The lamp of claim 31, wherein the fiber mat has a thickness in a range between 1 to 500 microns.

35. The lamp of claim 31, wherein the stimulable particles comprise at least one of quantum dots and nano-phosphors.

36. The lamp of claim 31, wherein the stimulable particles comprise a plurality of color-distinctive light emitters configured to produce respective secondary light emissions from the primary light.

37. The lamp of claim 31, further comprising:
a transparent encapsulant encasing the primary light source and the fiber mat.

38. The lamp of claim 31, wherein the primary light source comprise at least one of a light emitting diode, a light emitting diode array, a laser, and a laser diode array.

39. A device for light scattering, comprising:
a fiber mat including,
nanofibers having an average fiber diameter in a range between 100 and 2000 nm and having a surface pore on at least one of the nanofibers increasing a surface area of the at least one of the nanofibers; and
said nanofibers and said surface pore providing scattering sites within the fiber mat for the visible light at a wavelength $\lambda$.

40. The device of claim 39, wherein the average fiber diameter is in a range between 300 to 600 nm.

41. The device of claim 40, wherein the average fiber diameter is in a range between 400 nm to 500 nm.

42. The device of claim 39, wherein the average fiber diameter is in a range of 0.50 to 1.50 of the wavelength $\lambda$.

43. The device of claim 42, wherein the average fiber diameter is in a range of 0.9 to 1.10 of the wavelength $\lambda$.

44. The device of claim 39, wherein the wavelength $\lambda$ is in a range between 380 and 600 nanometers.

45. The device of claim 44, wherein the wavelength $\lambda$ is in a range between 400 and 500 nanometers.

46. The device of claim 39, wherein the fiber mat has a thickness in a range between 0.01 microns and 2,000 microns.

47. The device of claim 39, wherein the fiber mat has a thickness in a range between 1 to 500 microns.

48. The device of claim 39, further comprising:
a transparent encapsulate encasing the fiber mat.

* * * * *